US010155520B2

(12) United States Patent
Kim

(10) Patent No.: US 10,155,520 B2
(45) Date of Patent: Dec. 18, 2018

(54) DRIVER ASSISTANCE APPARATUS AND CONTROL METHOD THEREOF

(71) Applicant: LG ELECTRONICS INC., Seoul (KR)

(72) Inventor: Jeongsu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/460,270

(22) Filed: Mar. 16, 2017

(65) Prior Publication Data

US 2017/0267244 A1   Sep. 21, 2017

(30) Foreign Application Priority Data

Mar. 16, 2016   (KR) .................. 10-2016-0031414

(51) Int. Cl.
*B60W 30/18*   (2012.01)
*B60W 10/06*   (2006.01)
(Continued)

(52) U.S. Cl.
CPC ...... *B60W 30/18109* (2013.01); *B60W 10/06* (2013.01); *B60W 10/10* (2013.01);
(Continued)

(58) Field of Classification Search
CPC .......... B60W 30/18109; B60W 10/06; B60W 10/10; B60W 10/182; B60W 30/09; B60W 30/18018; B60W 30/180227; B60W 30/18054; B60W 30/18118; B60W 50/0098; B60W 2040/0881; B60W 2420/52; B60W 2420/54; B60W 2540/12; B60W 2540/16; B60W 2550/142;
(Continued)

(56) References Cited

U.S. PATENT DOCUMENTS

2007/0170775 A1 *  7/2007  Uchimura ............... B60T 7/107
                                                303/112
2012/0136558 A1    5/2012  Kim et al.
(Continued)

FOREIGN PATENT DOCUMENTS

DE          10211466        8/2003
EP          0595712         5/1994
(Continued)

OTHER PUBLICATIONS

Extended European Search Report in European Application No. 17161128.8, dated Jul. 11, 2017, 9 pages (with English translation).

*Primary Examiner* — Marthe Y Marc-Coleman
(74) *Attorney, Agent, or Firm* — Fish & Richardson P.C.

(57) ABSTRACT

A driver assistance apparatus for a vehicle may be provided with Idle Stop and Go (ISG), and the driver assistance apparatus may include: an interface configured to receive information; and a processor. The processor may be configured to: receive, through the interface, driving information of the vehicle; and based on a determination that the vehicle is stopped in a first state in which the ISG is enabled or that the vehicle is stopped in a second state in which a gearshift of the vehicle is engaged in a Park (P) mode and an engine of the vehicle is turned on, perform a stopping operation for the vehicle based on the driving information of the vehicle.

19 Claims, 35 Drawing Sheets

(51) Int. Cl.
*B60W 10/10* (2012.01)
*B60W 10/18* (2012.01)
*B60W 30/09* (2012.01)
B60W 40/08 (2012.01)
G01S 19/13 (2010.01)
B60W 50/00 (2006.01)
B60Q 9/00 (2006.01)
F02N 11/08 (2006.01)
F02N 11/10 (2006.01)
G01S 13/93 (2006.01)

(52) U.S. Cl.
CPC .......... *B60W 10/182* (2013.01); *B60W 30/09* (2013.01); *B60W 30/18018* (2013.01); *B60W 30/18027* (2013.01); *B60W 30/18054* (2013.01); *B60Q 9/00* (2013.01); *B60W 30/18118* (2013.01); *B60W 50/0098* (2013.01); *B60W 2040/0881* (2013.01); *B60W 2420/52* (2013.01); *B60W 2420/54* (2013.01); *B60W 2540/12* (2013.01); *B60W 2540/16* (2013.01); *B60W 2550/142* (2013.01); *B60W 2710/18* (2013.01); *F02N 11/0818* (2013.01); *F02N 11/0822* (2013.01); *F02N 11/0829* (2013.01); *F02N 11/10* (2013.01); *F02N 2200/0801* (2013.01); *F02N 2200/0802* (2013.01); *F02N 2200/102* (2013.01); *F02N 2200/106* (2013.01); *F02N 2200/12* (2013.01); *F02N 2200/124* (2013.01); *G01S 13/93* (2013.01); *G01S 13/931* (2013.01); *G01S 19/13* (2013.01)

(58) Field of Classification Search
CPC ............ B60W 2710/18; F02N 11/0118; F02N 11/0822; F02N 2200/01; F02N 2200/106; F02N 2200/12; F02N 2200/124; G01S 13/93; G01S 13/931; G01S 19/13
USPC .......................................................... 701/70
See application file for complete search history.

(56) References Cited

U.S. PATENT DOCUMENTS

| 2012/0143467 | A1* | 6/2012 | Yu | F02N 11/0818 701/102 |
|---|---|---|---|---|
| 2012/0143481 | A1 | 6/2012 | Yu et al. | |
| 2013/0170775 | A1* | 7/2013 | Cymbal | F16C 33/30 384/456 |
| 2018/0022358 | A1* | 1/2018 | Fung | G06K 9/00536 |

FOREIGN PATENT DOCUMENTS

| EP | 2826980 | 1/2015 |
|---|---|---|
| JP | 2012236485 | 12/2012 |
| JP | 2015034484 | 2/2015 |
| KR | 10-2012-0002340 | 1/2012 |
| KR | 10-2012-0063400 | 6/2012 |
| WO | 2010037459 | 4/2010 |

* cited by examiner

DRIVER ASSISTANCE APPARATUS AND CONTROL METHOD THEREOF

CROSS-REFERENCE TO RELATED APPLICATIONS

The present application claims the benefit of an earlier filing date and right of priority under 35 U.S.C. 119 and 35 U.S.C. 365 to Korean Patent Application No. 10-2016-0031414, filed on Mar. 16, 2016 in the Korean Intellectual Property Office, the content of which is hereby incorporated by reference in its entirety.

TECHNICAL FIELD

The present disclosure relates to a driver assistance apparatus and a control method thereof.

BACKGROUND

A vehicle is a machine which is moved by wheels and is used to carry people or goods from place to place. Examples of a vehicle include two-wheeled vehicles such as motorcycles, four-wheeled vehicles such as cars, and other types of vehicles such as trucks and trains.

For safety and convenience of vehicle users, technology for integrating various sensors and electronic devices into vehicles is being developed. For example, some vehicles are provided with devices providing various driving convenience functions, such as smart cruise control and lane keeping assistance. In addition, autonomous driving vehicles are being developed that perform self-driving, with minimal user manipulation, based on detecting external environments around the vehicle.

An example of a technology developed for some vehicles is idle stop-and-go (ISG), which automatically turns off the engine of a vehicle when the state of the vehicle satisfies engine turn-off conditions, and automatically turns on the engine again when at least one of engine turn-on conditions is satisfied. As such, ISG can restrict idling of a vehicle, thereby mitigating exhaust gas and promoting mileage improvement.

SUMMARY

Implementations are described herein that provide a driver assistance apparatus that, based on driving information for a vehicle, automatically performs a stopping operation for the vehicle to maintain the vehicle in a stopped state.

In one aspect, a driver assistance apparatus for a vehicle may be provided with Idle Stop and Go (ISG), and the driver assistance apparatus may include: an interface configured to receive information; and at least one processor. The at least one processor may be configured to: receive, through the interface, driving information of the vehicle; and based on a determination that the vehicle is stopped in a first state in which the ISG is enabled or that the vehicle is stopped in a second state in which a gearshift of the vehicle is engaged in a Park (P) mode and an engine of the vehicle is turned on, perform a stopping operation for the vehicle based on the driving information of the vehicle.

In some implementations, the stopping operation for the vehicle may include at least one of blocking a disabling operation of the ISG, turning off the engine of the vehicle, or activation of a parking brake of the vehicle.

In some implementations, the at least one processor may be further configured to: determine whether a first stopping condition and a second stopping condition for the vehicle are satisfied based on data included in the driving information of the vehicle; and perform the stopping operation for the vehicle based on a determination that the first stopping condition and the second stopping condition are sequentially satisfied.

In some implementations, the first stopping condition may include at least one of an opening of a door of a driver seat of the vehicle, a release of a safety belt of the driver seat, an opening of a trunk of the vehicle, an opening of a hood of the vehicle, detection of an obstruction around the vehicle, or occurrence of an accident involving the vehicle. The second stopping condition may include a release of a brake pedal of the vehicle.

In some implementations, the first stopping condition may include a shifting of the gearshift of the vehicle to a Neutral (N) mode or a Reverse (R) mode while the vehicle is on an uphill road, or a shifting of the gearshift to the Neutral (N) mode or a Drive (D) mode while the vehicle is on a downhill road. The second stopping condition may include a release of a brake pedal of the vehicle.

In some implementations, the stopping operation for the vehicle may include the activation of the parking brake of the vehicle comprising at least one of an activation of an electronic parking brake (EPB) of the vehicle or an activation of a foot parking brake of the vehicle. The at least one processor may be further configured to control a braking power of the vehicle according to the EPB or the foot parking brake based on a gradient of the uphill road or a gradient of the downhill road.

In some implementations, the first stopping condition may include continuous application of a brake pedal of the vehicle since a most recent time the vehicle was stopped, and the second stopping condition may include the vehicle moving at a speed greater than or equal to a threshold speed for a distance greater than or equal to a threshold distance.

In some implementations, the at least one processor may be further configured to perform the stopping operation for the vehicle based on a detection that an object is caught in an open door of the vehicle.

In some implementations, the driving information may include a torque value measured by a torque sensor associated with the open door, and the at least one processor may be configured to detect that the object is caught in the open door based on the torque value associated with the open door.

In some implementations, the at least one processor may be further configured to: determine whether a passenger exits the vehicle based on a determination of whether a door of the vehicle is open; and in a state in which the trunk of the vehicle is open, the gearshift is engaged in a Reverse (R) mode, and the passenger exits the vehicle, perform the stopping operation for the vehicle based on a detection of an object moving behind the vehicle.

In some implementations, the at least one processor may be further configured to: in a state in which the trunk of the vehicle is open on an uphill road, the gearshift is engaged in a Neutral (N) mode, and the passenger exits the vehicle, perform the stopping operation based on a determination of a brake pedal of the vehicle being released and based on the detection of the object moving behind the vehicle.

In some implementations, the interface may be configured to receive sensing information from at least one sensor provided at a rear portion of the vehicle, and the at least one processor may be configured to detect the object moving behind the vehicle based on the sensing information received from the at least one sensor provided at the rear portion of the vehicle.

In some implementations, the interface may be configured to receive an image of an outside of the vehicle provided by a camera included in the vehicle, and the at least one processor may be further configured to: detect at least one object from the image of the outside of the vehicle; and perform the stopping operation for the vehicle based on object information regarding the at least one object detected from the image of the outside of the vehicle. The object information may include at least one of a type, a position, a speed, a shape, or a size of the at least one object.

In some implementations, the at least one processor may be further configured to: based on a determination that the at least one object detected from the image of the outside of the vehicle comprises an obstruction, perform the stopping operation for the vehicle based on a relative position of the obstruction with respect to the vehicle. The obstruction may correspond to at least one of another vehicle, a pedestrian, a tree, a fallen object, or a structure.

In some implementations, the at least one processor may be configured to perform the stopping operation for the vehicle based on a determination that the obstruction is located within a threshold distance from a front side of the vehicle and that the gearshift of the vehicle is engaged in a Drive (D) mode.

In some implementations, the at least one processor may be further configured to perform the stopping operation for the vehicle based on a determination that the obstruction is located within a threshold distance from a rear side of the vehicle and that the gearshift of the vehicle is engaged in a Reverse (R) mode.

In some implementations, the driving information may include information regarding an open state of at least one door of the vehicle and an information regarding an opening angle of an open door of the vehicle. The at least one processor may be further configured to, based on a determination that a door of the vehicle is open and that the obstruction is located at a side of the door that is open, perform the stopping operation for the vehicle based on an opening angle of the door that is open.

In some implementations, the driving information may include information regarding whether at least one window of the vehicle is open, and the at least one processor may be further configured to, based on a determination that a window of the vehicle is open, that the obstruction is located at the side of the window that is open, and that the detected object comprises a part of the body of a passenger protruding from the window that is open, perform the stopping operation for the vehicle based on a protruding length of the part of the body of the passenger.

In some implementations, the at least one processor may be further configured to stop execution of the stopping operation for the vehicle based on a determination that the part of the body of the passenger protruding from the window that is open has moved inside the window that is open.

In some implementations, the at least one processor may be further configured to output, through an output device included in the vehicle and based on performing the stopping operation of the vehicle, a message regarding the stopping operation.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

Details of other implementations are included in the detailed description and drawings. The description and specific examples below are given by way of illustration only, and various changes and modifications will be apparent.

DETAILED DESCRIPTION

Figure 1:
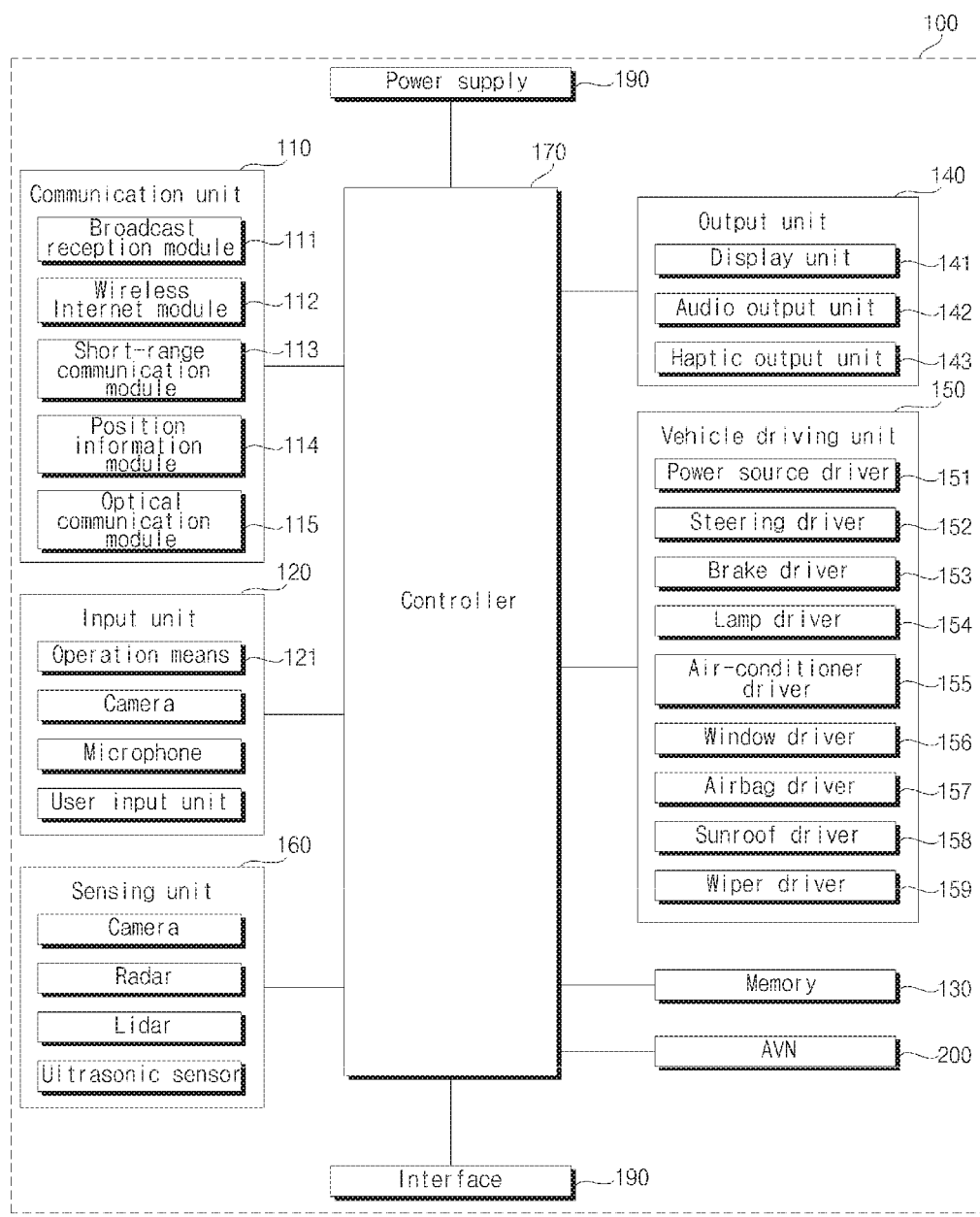
FIG. 1 is a block diagram illustrating an example of a vehicle according to some implementations.

In some implementations, ISG technology automatically turns the engine of a vehicle on or off based on conditions in and/or around the vehicle. For example, the ISG may automatically turn off the vehicle's engine when the vehicle comes to a stop at a red light by detecting an input applied to a brake pedal in a state in which a vehicle speed is less than a reference speed and no input is applied to an accelerator pedal. The ISG may then automatically turn back on the vehicle's engine when the driver begins driving at a green light, for example by detecting an input applied to the accelerator pedal and no input applied to the brake pedal.

A vehicle provided with ISG technology may be vulnerable while the vehicle is stopped and the vehicle engine is temporarily turned off by the ISG. For example, the driver or a passenger and a neighboring person or facility may be at risk if the driver or passenger attempts to exit the vehicle upon misrecognizing the state in which the engine is temporarily turned off by the ISG. In this scenario, the driver may mistakenly release the brake pedal, resulting in the ISG automatically turning on the vehicle's engine and allowing movement of the vehicle. Accordingly, the vehicle may move forward or backward without being properly secured, which may result in an accident.

As another example that is not limited to scenarios with ISG technology, the driver may attempt to exit the vehicle even though the gearshift of the vehicle is not in Park (P) mode, resulting in a dangerous situation similar to the aforementioned situation.

Implementations are disclosed herein that enable a driver assistance apparatus and a control method thereof that controls a vehicle to automatically perform at least one operation for stopping the vehicle according to the state of the vehicle or conditions around the vehicle. As such, in some scenarios the driver assistance apparatus may improve safety of persons in and around the vehicle.

According to at least one implementation, when a vehicle provided with ISG is in a stopped state, the driver assistance apparatus may automatically perform a stopping operation that maintains the stopped state of the vehicle according to vehicle driving information. In some scenarios, this may reduce a risk of collision with neighboring persons or objects around the vehicle. For example, the driver assistance apparatus may control the vehicle to maintain the stopped state at least temporarily by automatically executing at least one of an operation of blocking a disabling operation of the ISG, an operation of turning off the engine of the vehicle, or an operation of activating a parking brake of the vehicle. The stopping operation may be performed based on a state of a door of the vehicle, a safety belt, an operation of a brake pedal, a trunk, or a hood of the vehicle.

In some implementations, the stopping operation may be selectively performed such that the stopped state of the vehicle is maintained according to a gearshift position of the vehicle and a slope direction of a road surface. For example, the stopping operation may be performed based on the gearshift being engaged in a particular gear mode while the vehicle is on uphill or downhill slope directions.

In some implementations, the driver assistance apparatus may perform the stopping operation by differentially controlling a braking power of the vehicle according to the gradient of a road surface. As such, the apparatus may help ensure, when performing the stopping operation, that the vehicle maintains the stopped state in different road gradient conditions.

Moreover, in some implementations, the stopping operation may be selectively performed based on a position of an obstruction around the vehicle and according to a gearshift position of the vehicle.

In addition, in some implementations, when the vehicle is involved in an accident while in a stopped state, the stopping operation may be automatically performed such that the stopped state of the vehicle is maintained according to whether the brake pedal is released.

As such, implementations described herein may, in some scenarios, improve safety of a vehicle by preventing dangerous movements of the vehicle while the vehicle is in a stopped state.

A vehicle described in this disclosure may include a car or a motorcycle, but implementations are not necessarily limited thereto, and may generally include any suitable vehicle that transports people. Hereinafter, a car is described as the vehicle.

The vehicle described in this disclosure may include an internal combustion engine vehicle having an engine as a power source, a hybrid vehicle having an engine and an electric motor as a power source, an electric vehicle having an electric motor as a power source, or generally a vehicle that is motorized by any suitable power source.

FIG. 1 is a block diagram of a vehicle 100 according to some implementations.

The vehicle 100 may include a communication unit 110, an input unit 120, a memory 130, an output unit 140, a vehicle driving unit 150, a sensing unit 160, a controller 170, an interface 180 and a power supply unit 190.

The communication unit 110 may include one or more modules for enabling wireless communication between the vehicle 100 and external devices (e.g. a mobile terminal, an external server and another vehicle). In addition, the communication unit 110 may include one or more modules for linking the vehicle 700 to one or more networks.

The communication unit 110 may include a broadcast reception module 111, a wireless Internet module 112, a short-range communication module 113, a position information module 114 and an optical communication module 115.

The broadcast reception module 111 receives broadcast signals or broadcast related information from an external broadcast management server through broadcast channels. Here, broadcast includes radio broadcast and TV broadcast.

The wireless Internet module 112 refers to a module for wireless Internet access and may be embedded in the vehicle 100 or provided to the outside of the vehicle 100. The wireless Internet module 112 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 112 transmits and receives data according to at least one of wireless Internet technologies including those not above-mentioned. For example, the wireless Internet module 112 may wirelessly exchange data with an external server. The wireless Internet module 112 may receive weather information and traffic information (e.g., TPEG (Transport Protocol Expert Group) information) from the external server.

The short-range communication module 113 is a module for short range communication and may support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 113 may perform short-range communication between the vehicle 100 and at least one external device by establishing wireless area networks. For example, the short-range communication module 113 may exchange data with a mobile terminal of a passenger of the vehicle. The short-range communication module 113 may receive weather information and traffic information (e.g., TPEG information) from a mobile terminal or an external server. When the user gets in the vehicle 100, the mobile terminal of the user and the vehicle 100 may be paired automatically or according to execution of an application by the user.

The position information module 114 is a module for locating the vehicle 100 and a typical example thereof is a GPS (Global Positioning System) module. For example, the vehicle may acquire the location thereof using signals sent from a GPS satellite using the GPS module.

The optical communication module 115 may include a light transmission unit and a light receiving unit.

The light receiving unit converts a light signal into an electrical signal so as to receive information. The light receiving unit may include a photodiode (PD) for receiving light. The photodiode converts light into an electrical signal. For example, the light receiving unit may receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit may emit a light signal through flickering of the light-emitting element, which corresponds to a predetermined frequency. According to an implementation, the light transmission unit may include a plurality of light-emitting element arrays. According to an implementation, the light transmission unit may be integrated with a lamp provided to the vehicle 100. For example, the light transmission unit may be at least one of a headlight, a taillight, a brake light, a turn signal lamp and a sidelight. For example, the optical communication module 115 may exchange data with another vehicle through optical communication.

The input unit 120 may include an input operation unit 121, a microphone 123 and a user input unit 124.

The input operation unit 121 receives user input for driving the vehicle 100. The input operation unit 121 may include, for example, a steering input unit, a shift input unit, an acceleration input unit, and/or a brake input unit.

The user applies steering input to the steering input unit. The steering input unit may include, for example, a steering wheel. According to an implementation, the steering input unit may be configured in the form of a touchscreen, a touch pad or a button.

The user applies inputs with respect to park (P), drive (D), neutral (N), reverse (R) of the vehicle 100 through the shift input unit. The shift input unit is preferably configured in the form of a lever. According to an implementation, the shift input unit may be configured in the form of a touchscreen, a touch pad or a button.

The user applies input with respect to acceleration of the vehicle 100 through the acceleration input unit. The user applies input with respect to reduction of the speed of the vehicle 100 to the brake input unit. The acceleration input unit and the brake input unit are preferably configured in the form of a pedal. According to an implementation, the acceleration input unit or the brake input unit may be configured in the form of a touchscreen, a touch pad or a button.

A camera 122 is provided to one side of the interior of the vehicle 100 so as to photograph an indoor image of the vehicle 100. For example, the camera 122 may be provided to various portions of the vehicle 100, such as the surface of the dashboard, the surface of the roof and the rear view mirror, so as to photograph a passenger in the vehicle 100. In this case, the camera 122 may generate an indoor image of a region including the driver seat of the vehicle 100. In addition, the camera 122 may generate an indoor image of a region including the driver seat and passenger seat. An indoor image generated by the camera 122 may be a 2-dimensional image and/or 3-dimensional image. To generate a 3D image, the camera 122 may include at least one of a stereo camera, a depth camera and a 3D laser scanner. The camera 122 may provide the indoor image to the controller 170 functionally coupled thereto.

The controller 170 may detect objects by analyzing the indoor image provided by the camera 122. For example, the controller 170 may detect a gaze and/or a gesture of the driver from a part of the indoor image, which corresponds to the driver seat area. As another example, the controller 170 may detect a gaze and/or a gesture of a passenger from a part of the indoor image, which corresponds to an indoor region other than the driver seat area. The gazes and/or gestures of the driver and the passenger may be detected simultaneously or independently.

The microphone 123 may process an external audio signal into electrical data. The processed data may be used in various manners according to functions executed in the vehicle 100. The microphone 123 may convert a voice command of the user into electrical data. The converted electrical data may be transmitted to the controller 170.

According to an implementation, the camera 122 or the microphone 123 may be included in the sensing unit 160 instead of the input unit 120.

The user input unit 124 is used to receive information from the user. Upon input of information through the user input unit 124, the controller 170 may control operation of the vehicle 100 to respond to the input information. The user input unit 124 may include a touch type input unit or a mechanical input unit. According to an implementation, the user input unit 124 may be provided to a region of the steering wheel of the vehicle. In this case, the driver may operate the user input unit 124 with a finger while gripping the steering wheel.

The input unit 120 may include a plurality of buttons or a touch sensor. Various inputs may be input through the plurality of buttons or touch sensor.

The sensing unit 160 senses signals related to driving of the vehicle 100. To this end, the sensing unit 160 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an infrared sensor, radar 162, lidar 163 and an ultrasonic sensor 164.

Accordingly, the sensing unit 160 may acquire sensing signals with respect to vehicle collision information, vehicle direction information, vehicle position information (GPS information), heading information, speed information, acceleration information, vehicle tilt information, driving/reversing information, battery information, fuel information, tire information, vehicle lamp information, vehicle internal temperature information, vehicle internal humidity information, steering wheel rotation angle information and the like. The controller 170 may generate control signals for acceleration, deceleration and heading of the vehicle 100 on the basis of external environment information acquired through at least one of the camera, ultrasonic sensor, infrared sensor, radar and lidar included in the vehicle 100. Here, the external environment information may be information related to objects located within a predetermined range from the vehicle 100 which is being driven. For example, the external environment information may include information about the number of obstructions located within 100 m of the vehicle 100, distances between the obstructions and the vehicle 100, and sizes and types of the obstructions.

In addition, the sensing unit 160 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensing unit 160 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the camera 122 and the microphone 123 may operate as a sensor. The biometric information sensor may acquire information on a hand and face recognition information through the camera 122.

The sensing unit 160 may include at least one camera 161 for photographing the outside of the vehicle 100. The camera 161 may be an external camera. For example, the sensing unit 160 may include a plurality of cameras 161 provided to different points of the exterior of the vehicle 100. The camera 161 may include an image sensor and an image processing module. The camera 161 may process a still image or video acquired through the image sensor (e.g. CMOS or CCD). The image processing module may process the still image or video acquired through the image sensor to extract necessary information and transfer the extracted information to the controller 170.

The camera 161 may include an image sensor (e.g. CMOS or CCD) and an image processing module. In addition, the camera 161 may process a still image or video acquired through the image sensor. The image processing module may process the still image or video acquired through the image sensor. Furthermore, the camera 161 may acquire an image including at least one of a traffic light, a traffic sign, a pedestrian, another vehicle and a road.

The output unit 140 outputs information processed in the controller 170 and may include a display unit 141, an audio output unit 142 and a haptic output unit 143.

The display unit 141 may display information processed in the controller 170. For example, the display 141 may display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle 100.

The display unit 141 may include at least one of a liquid crystal display (LCD), a thin film transistor-liquid crystal display (TFT LCD), an organic light-emitting diode (OLED), a flexible display, a 3D display and an e-ink display.

The display unit 141 may implement a touchscreen by forming a layered structure with a touch sensor or by being integrated with the touch sensor. Such touchscreen may function as the user input unit 124 that provides an input interface between the vehicle 100 and the user and, simultaneously, provide an output interface between the vehicle 100 and the user. In this case, the display 141 may include a touch sensor for sensing touch applied to the display unit 141 such that a control command is input to the display unit 141 through touch. When touch is applied to the display unit 141, the touch sensor may sense the touch and the controller 170 may generate a control command corresponding to the touch on the basis of the sensed touch. Input applied through touch may be text, figures or menu items that may be indicated or designated in various modes.

The display unit 141 may include a cluster to enable the driver to drive the vehicle and, simultaneously, to check vehicle state information or vehicle driving information. The cluster may be provided on the dashboard. In this case, the driver can check information displayed on the cluster while looking forward.

According to an implementation, the display unit 141 may be implemented as an HUD (Head Up Display). When the display 141 is implemented as an HUD, information may be output through a transparent display provided to the windshield of the vehicle. Alternatively, the display unit 141 may include a projection module so as to output information through an image projected to the windshield.

The audio output unit 142 converts an electrical signal from the controller 170 into an audio signal and outputs the audio signal. To this end, the audio output unit 142 may include a speaker. The audio output unit 142 may output sound corresponding to operation of the user input unit 124.

The haptic output unit 143 generates haptic output. For example, the haptic output unit 143 may vibrate the steering wheel, a seat belt or a seat to enable the user to recognize haptic output.

The vehicle driving unit 150 may control operations of various apparatuses of the vehicle. The vehicle driving unit 150 may include a power source driver 151, a steering driver 152, a brake driver 153, a lamp driver 154, an air-conditioner driver 155, a window driver 156, an airbag driver 157, a sunroof driver 158 and a wiper driver 159.

The power source driver 151 may perform electronic control of a power source of the vehicle 100. The power source driver 151 may include an accelerator for increasing the speed of the vehicle 100 and a brake for decreasing the speed of the vehicle 100.

For example, when the power source is a fossil fuel (e.g. gasoline or diesel) based engine (not shown), the power source driver 151 may perform electronic control of the engine so as to control the output torque and revolutions per minute (RPM) of the engine. When the power source driver 151 is an engine, the speed of the vehicle may be limited by restricting an engine output torque under the control of the controller 170.

Alternatively, when an electric motor (not shown) is a power source, the power source driver 151 may control the motor. Accordingly, revolutions per minute (RPM), torque and the like of the motor may be controlled.

When the vehicle 100 is a hybrid car, both the engine and the motor may be configured as a power source.

The steering driver 152 may include a steering apparatus. The steering driver 152 may electronically control the steering apparatus of the vehicle 100. For example, the steering driver 152 may include a steering torque sensor, a steering angle sensor and a steering motor. The steering toque sensor may sense a steering torque applied by the driver to the steering wheel. The steering driver 152 may control a steering torque and a steering angle by changing the magnitude and direction of current applied to the steering motor on the basis of the speed and steering torque of the vehicle 100. In addition, the steering driver 152 may determine whether the vehicle 100 is correctly steered on the basis of steering angle information acquired through the steering angle sensor. In this manner, heading of the vehicle may be changed. In addition, the steering driver 152 may reduce the weight of the steering wheel by increasing the steering torque of the steering motor when the vehicle 100 travels at a low speed and increase the weight of the steering wheel by decreasing the steering torque of the steering motor when the vehicle 100 travels at a high speed. When an autonomous driving function of the vehicle 100 is executed, the steering driver 152 may control the steering motor to generate an appropriate steering torque on the basis of a sensing signal output from the sensing unit 160 or a control signal provided by the controller 170, even when the driver operates the steering wheel (e.g. when steering torque is not sensed).

The brake driver 153 may electronically control a brake apparatus of the vehicle 100. For example, the brake driver 153 may reduce the speed of the vehicle 100 by controlling the operation of a brake provided to the wheels. As another example, the brake driver 153 may adjust the direction of the vehicle 100 to the left or right by differently operating brakes respectively provided to the left and right wheels.

The lamp driver 154 may turn on/turn off lamps provided to the inside and outside of the vehicle 100. The lamp driver 154 may include a lighting apparatus. In addition, the lamp driver 154 may control illuminance, directions and the like of lamps included in the lighting apparatus. For example, the lamp driver 154 may control the turn signal, head lamp, brake lamp and the like.

The air-conditioner driver 155 may electronically control an air conditioner of the vehicle 100. For example, the air-conditioner driver 155 may control the air conditioner to supply chilly air to the inside of the vehicle 100 when the internal temperature of the vehicle is high.

The window driver 156 may electronically control a window apparatus of the vehicle 100. For example, the window driver 156 may control opening or closing of left and right windows provided to the side of the vehicle.

The airbag driver 157 may electronically control an airbag apparatus provided to the inside of the vehicle 100. For example, the airbag driver 157 may control the airbag apparatus to operate in a dangerous situation.

The sunroof driver 158 may electronically control a sunroof apparatus of the vehicle 100. For example, the sunroof driver 158 may control opening or closing of a sunroof.

The wiper driver 159 may electronically control wipers of the vehicle 100. For example, the wiper driver 159 may control the number of times of driving the wipers 14a and 14b, a wiper driving speed and the like according to user input upon reception of user input that instructs the wiper driver 159 to drive the wipers through the user input unit 124. As another example, the wiper driver 159 may automatically drive the wipers 14a and 14b without user input by determining the quantity or intensity of rainwater on the basis of a sensing signal of a rain sensor included in the sensing unit 160.

The vehicle driving unit 150 may further include a suspension driver (not shown). The suspension driver may electronically control a suspension apparatus of the vehicle 100. For example, the suspension driver may reduce vibration of the vehicle 100 by controlling the suspension apparatus when the surface of the road is rough.

The memory 130 is electrically connected to the controller 170. The memory 130 may store fundamental data about the units, control data for operation control of the units and input/output data. The memory 130 may be various types of storage devices such as a ROM, a RAM, an EPROM, a flash drive and a hard drive. The memory 130 may store various types of data for overall operation of the vehicle 100, such as programs for processing or control.

The interface 180 may function as a passage to various external devices connected to the vehicle 100. For example, the interface 180 may include a port that may be connected to a mobile terminal and be connected to the mobile terminal via the port. In this case, the interface 180 may exchange data with the mobile terminal.

The interface 180 may receive turn signal information. The turn signal information may be a turn-on signal of a turn signal for left turn or right turn, input by the user. When left or right turn signal turn-on input is received through the user input unit 124 of the vehicle 100, the interface 180 may receive left or right turn signal information.

The interface 180 may receive vehicle speed information, steering wheel rotation angle information or gearshift information. The interface 180 may receive vehicle speed information, steering wheel rotation angle information or gearshift information, sensed through the sensing unit 160 of the vehicle 100. The interface 180 may receive vehicle speed information, steering wheel rotation angle information or gearshift information from the controller 170 or the sensing unit 160 of the vehicle.

The gearshift information may be information about the position of the gearshift of the vehicle. For example, the gearshift information may be information about the position of the gearshift which corresponds to park P, reverse R, neutral N or drive D.

The interface 180 may receive user input applied through the user input unit 124 of the vehicle 100. The interface 180 may receive user input from the input unit 120 of the vehicle 100 or through the controller 170.

The interface 180 may receive information acquired from an external device. For example, when traffic light change information is received from an external server through the communication unit 110 of the vehicle 100, the interface 180 may receive the traffic light change information from the controller 170.

The controller 170 may control operations of the respective units of the vehicle 100. The controller 170 may be, for example, an ECU (Electronic Control Unit).

The controller 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply unit 190 may supply power necessary for operations of the respective components under the control of the controller 170. Particularly, the power supply unit 190 may be provided with power from a battery (not shown) inside the vehicle 100.

An audio video navigation (AVN) apparatus of the vehicle 100 may exchange data with the controller 170. The controller 170 may receive navigation information from the AVN apparatus. The navigation information may include information on a set destination, route information depending on the destination, map information regarding vehicle driving and vehicle location information.

Some components shown in FIG. 1 may not be mandatory to implement the vehicle 100. Accordingly, the vehicle 100 may include more or fewer components than the aforementioned components. At least one of the components shown in FIG. 1 may be replaced by another component.

Figure 2:
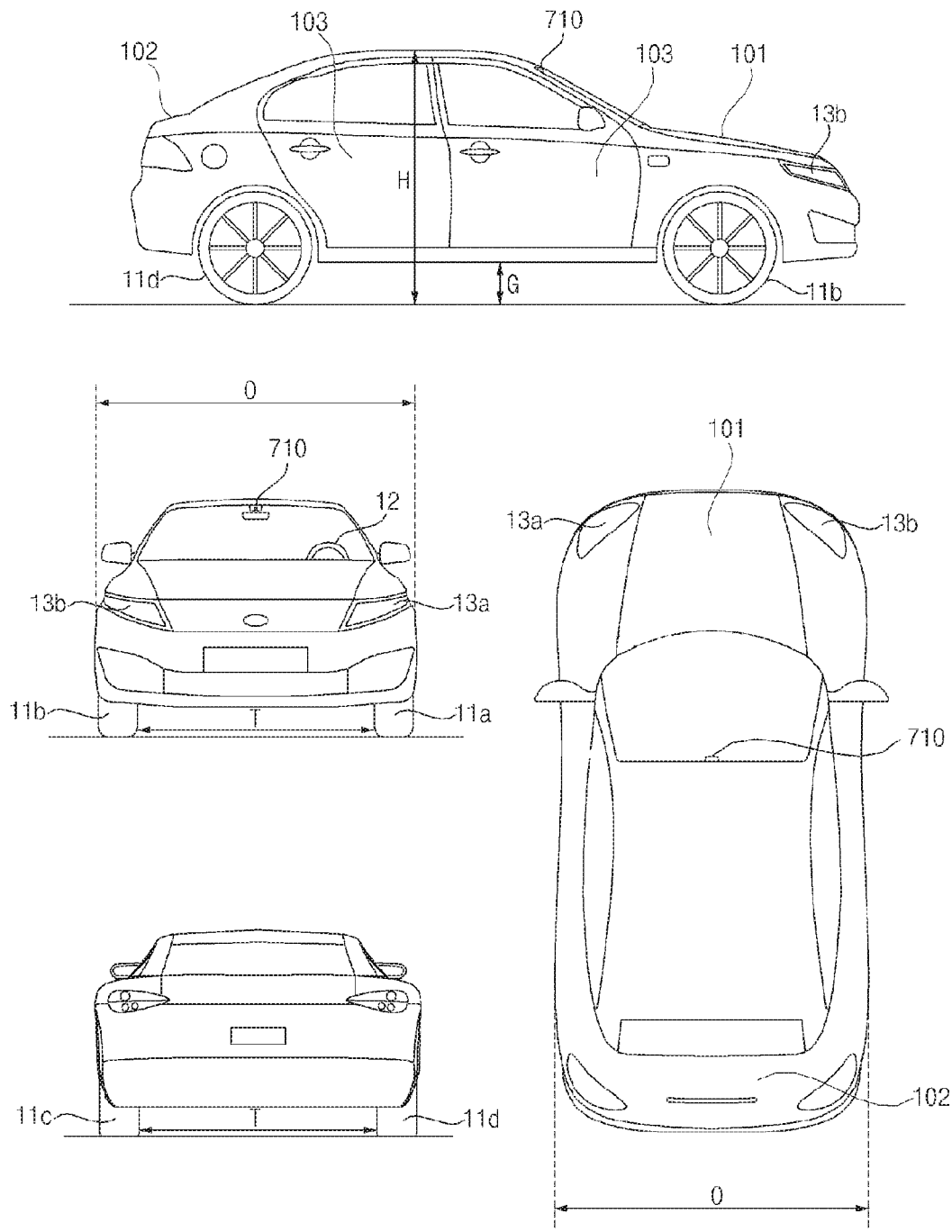
FIG. 2 is a diagram illustrating examples of an appearance of the vehicle of FIG. 1 viewed from various directions.

FIG. 2 shows the appearance of the vehicle 100 of FIG. 1, viewed from various directions. For convenience of description, the vehicle 100 is assumed to be a four-wheeled car.

Referring to FIG. 2, the vehicle 100 may include tires 11a, 11b, 11c and 11d which rotate by a power source, a steering wheel 12 for steering the vehicle 100, headlights 13a and 13b, a hood 101, a trunk 102, doors 103 and a window 104. The window 104 may be provided per door 103. The window 104 may be an electronically driven power window.

The overall height H of the vehicle 100, which is a length between the ground plane and the highest point of the body of the vehicle 100, may be changed within a predetermined range according to the weight or position of a passenger or load of the vehicle 100. The lowest point of the body of the vehicle 100 may be separated from the ground by a minimum ground clearance G. Accordingly, the body of the vehicle 100 may be prevented from being damaged by an object lower than the minimum ground clearance G.

It is assumed that the distance between the front left and right tires 11a and 11b equals the distance between the rear left and right tires 11c and 11d. In the following description, it is assumed that the distance between the inside of the front left tire 11a and the inside of the front right tire 11b and the distance between the inside of the rear left tire 11c and the inside of the rear right tire 11d have the same value T.

The overall width O of the vehicle 100 may be defined as a maximum distance between the left end and the right end of the body of the vehicle 100, except for side-view mirrors (e.g. electric folding type side-view mirrors).

A camera 195 separate from the camera 161 shown in FIG. 1 may be provided to one side of the windshield of the vehicle 100. The camera 195 may be a stereo camera that provides 3D data about a front view image in a wider range than that provided by a camera 161a of FIG. 4A and may be included in the sensing unit 160.

The controller 170 of the vehicle 100 or a processor of a driver assistance apparatus may acquire information about an external environment of the vehicle 100 on the basis of a front view image provided by the camera 195. For example, the information about the external environment may include data about objects (e.g., a pedestrian, a traffic light, an opposite vehicle and wall) located within the photographing range of the camera 195.

In this case, the controller 170 of the vehicle 100 or the processor of the driver assistance apparatus may output a control signal for performing at least one operation to the driving unit 150 on the basis of the information about the external environment. For example, the controller 170 of the vehicle 100 or the processor of the driver assistance apparatus may control at least one of an engine state, steering, acceleration, braking and lighting of the vehicle 100.

Figure 3:
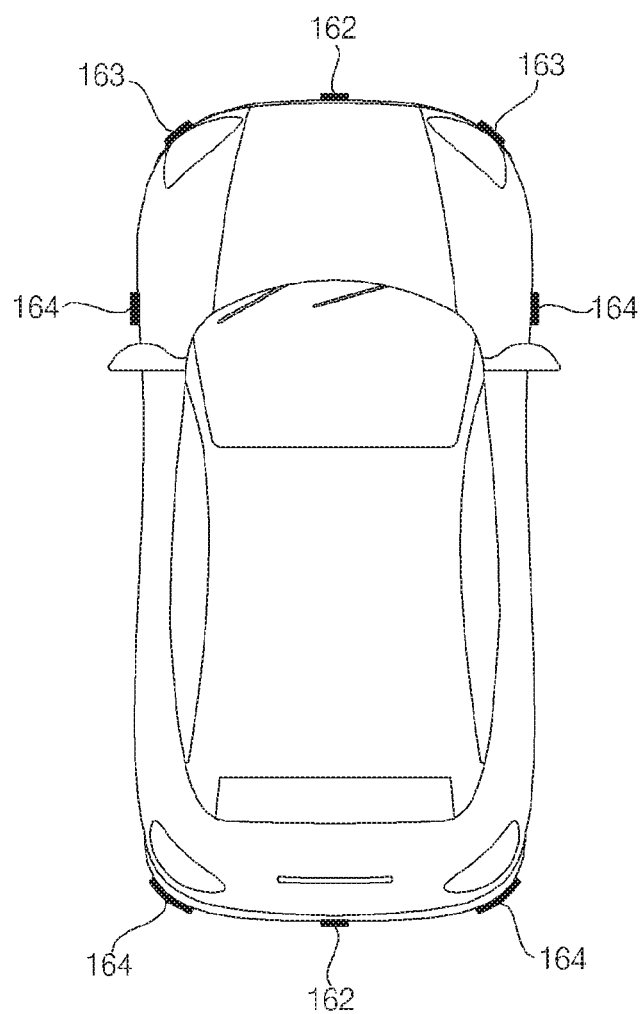
FIG. 3 is a diagram illustrating an example of a top view of the vehicle shown in FIG. 1.

FIG. 3 is a top view of the vehicle 100 aforementioned with reference to FIG. 1.

Referring to FIG. 3, at least one radar 162, at least one lidar 163 and at least one ultrasonic sensor 164 may be provided to various portions of the body of the vehicle 100, as described above with reference to FIG. 1.

Specifically, the radar 162 may be provided to one side of the vehicle 100 so as to transmit electromagnetic waves to surroundings and to receive electromagnetic waves reflected from objects present around the vehicle 100. For example, the radar 162 may acquire information about a distance, direction and height of an object by measuring propagation time of electromagnetic waves reflected by the object.

The lidar 163 may be provided to one side of the vehicle 100 so as to emit laser to surroundings of the vehicle 100. The laser emitted from the lidar 163 may be scattered or reflected to return to the vehicle 100 and the lidar 163 may acquire information about physical characteristics of a target located around the vehicle, such as distance, speed and shape, on the basis of time taken for the laser to return, intensity of the laser, frequency variation and polarization state change.

The ultrasonic sensor 164 is provided to one side of the vehicle 100 so as to generate ultrasonic waves toward surroundings of the vehicle 100. Ultrasonic waves generated by the ultrasonic sensor 164 have a high frequency (about 20 kHz or higher) and short wavelength. Such ultrasonic sensor 164 may be used to recognize an object close to the vehicle 100.

According to an implementation, different numbers of radars 162, lidars 163 and ultrasonic sensors 164 may be provided to positions different from those shown in FIG. 3. The vehicle 100 may not include at least one of the radar 162, lidar 163 and ultrasonic sensor 164.

Figure 4A:
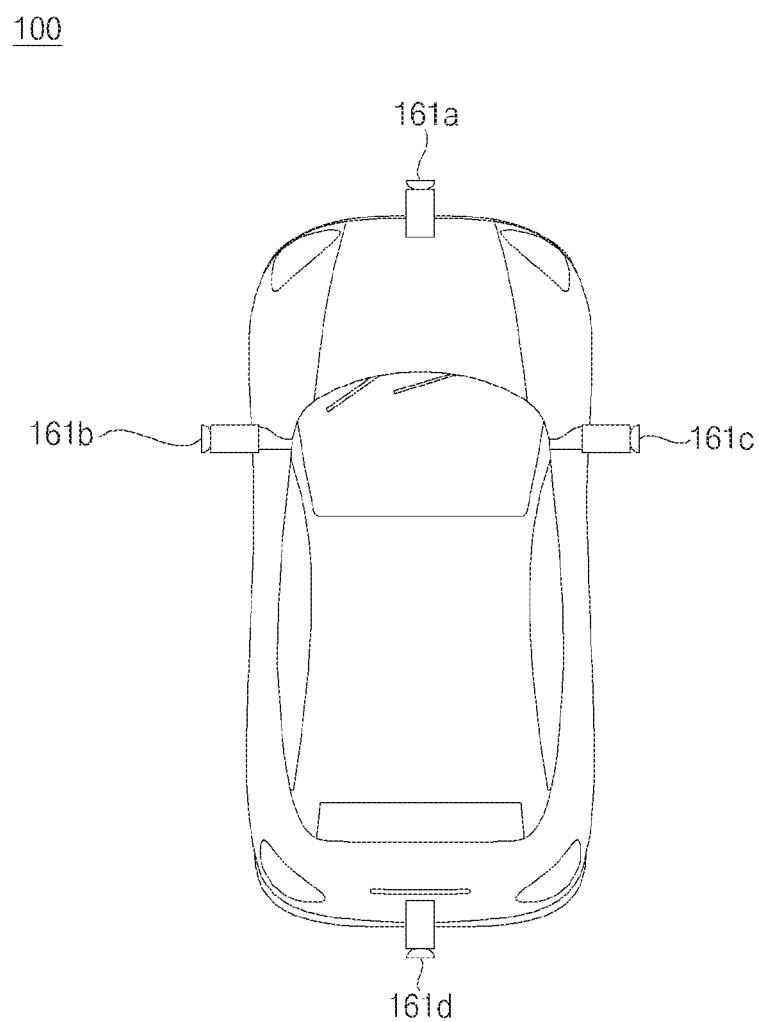
FIG. 4A is a diagram illustrating an example of multiple cameras installed at different positions of the vehicle.

FIG. 4A shows a plurality of cameras provided to different portions of the vehicle 100. For convenience of description, it is assumed that four cameras 161a, 161b, 161c and 161d are provided.

In this case, the four cameras 161a, 161b, 161c and 161d may be identical to the aforementioned camera 161.

Referring to FIG. 4A, the cameras 161a, 161b, 161c and 161d may be respectively provided to the front, left, right and rear sides of the vehicle 100. The cameras 161a, 161b, 161c and 161d may be included in the camera 161 shown in FIG. 1.

The front camera 161a may be disposed near the windshield, emblem or radiator grill of the vehicle.

The left camera 161b may be disposed inside of the case of the left side-view mirror. Alternatively, the left camera 161b may be provided outside of the case of the left side-view mirror. Furthermore, the left camera 161b may be provided to a region of the outside of the left front door, left rear door or left fender.

The right camera 161c may be disposed inside of the case of the right side-view mirror. Alternatively, the left camera 161c may be provided outside of the case of the right side-view mirror of the vehicle. Furthermore, the left camera 161c may be provided to a region of the outside of the right front door, right rear door or right fender of the vehicle.

The rear camera 161d may be disposed near the rear license plate or trunk switch of the vehicle.

Images respectively photographed by the cameras 161a, 161b, 161c and 161d are transmitted to the controller 170, and the controller 170 may generate an around view image of the vehicle 100 by combining the images.

While FIG. 4A shows the four cameras provided to the exterior of the vehicle 100, the number of cameras is not limited thereto and more or fewer cameras may be provided to portions different from those shown in FIG. 4A.

Figure 4B:
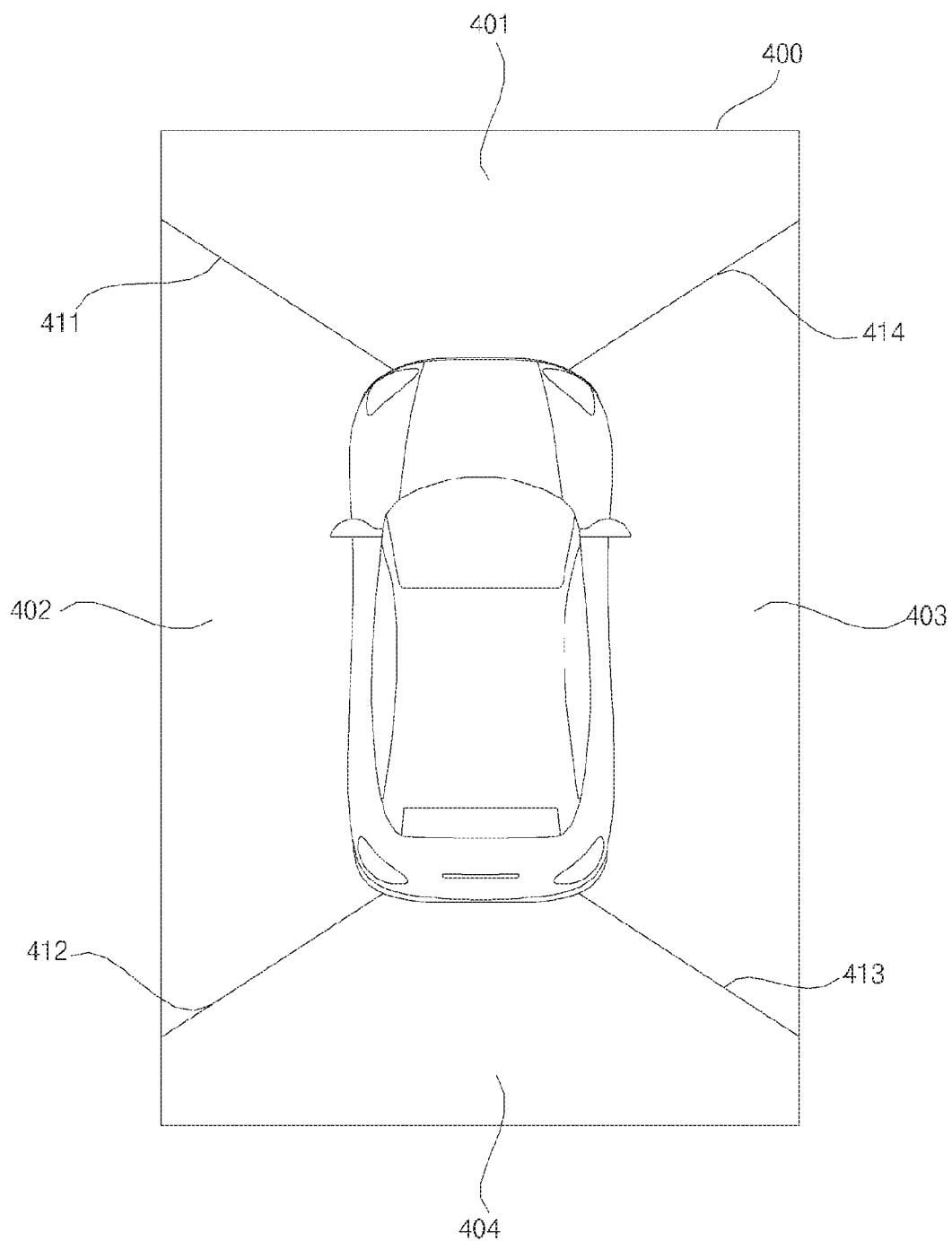
FIG. 4B is a diagram illustrating an example of an omnidirectional composite image with respect to the vehicle.

FIG. 4B shows an exemplary omnidirectional synthesized around view image 400 of the vehicle 100.

Referring to FIG. 4B, the image 400 may include a first image region 401 corresponding to an outdoor image photographed by the front camera 161a, a second image region 402 corresponding to an outdoor image photographed by the left camera 161b, a third image region 403 corresponding to an outdoor image photographed by the right camera 161c and a fourth image region 404 corresponding to an outdoor image photographed by the rear camera 161d. The image 400 may be, in some implementations, an around view monitoring image capturing a view around the vehicle.

When the image 400 is generated, boundaries 411, 412, 413 and 414 between outdoor images included in the image 400 are generated. The controller 170 may display a seamless image by image-blending the boundaries.

The boundaries 411, 412, 413 and 414 between images may be displayed. In addition, the image 400 may include a predetermined image representing the vehicle 100 at the center thereof.

The controller 170 may display the image 400 on a display device provided to the inside of the vehicle 100.

Figure 4C:
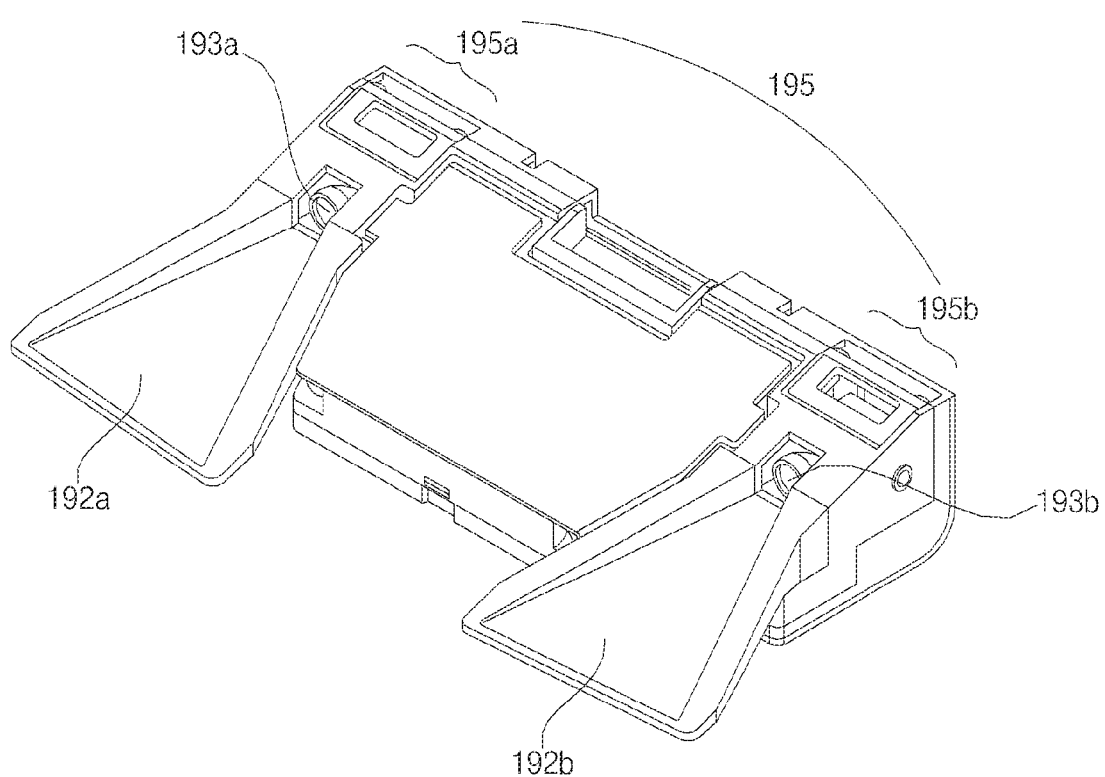
FIG. 4C is a diagram illustrating an example of a structure of a camera module provided to the windshield of the vehicle of FIG. 1.

FIG. 4C shows an exemplary structure of the camera module 195 provided to the windshield shown in FIG. 1.

Referring to FIG. 4C, the camera module 195 may include a first camera 195a and a second camera 195b. The second camera 195b may be separated from the first camera 195 by a predetermined distance. In this case, the camera module 195 may be, for example, a stereo camera, in which case images acquired by the first camera 195a and the second camera 195b may be stereo images.

Specifically, the first camera 195a may include a first image sensor and a first lens 193a. The second camera 195b may include a second image sensor and a second lens 193b. The first and second image sensors may be CCDs or CMOS sensors.

The camera module 195 may further include a first light shield 192a and a second light shield 192b for respectively shielding part of light input to the first lens 193a and the second lens 193b.

The camera module 195 may be configured such that the camera module 195 may be attached to/detached from the inside of the windshield of the vehicle 100.

The camera module 195 may acquire an around view of the vehicle. For example, the camera module 195 may acquire a front view image of the vehicle. The image acquired through the camera module 195 may be transmitted to the controller 170 or the driver assistance apparatus.

The driver assistance apparatus, which will be described later, may detect disparity of stereo images provided by the first and second cameras 195a and 195b and detect at least one object located in front of the vehicle 100 on the basis of the disparity. When an object is detected from the stereo images, the driver assistance apparatus may track the detected object continuously or periodically in order to determine movement trajectory of the object.

Figure 5A:
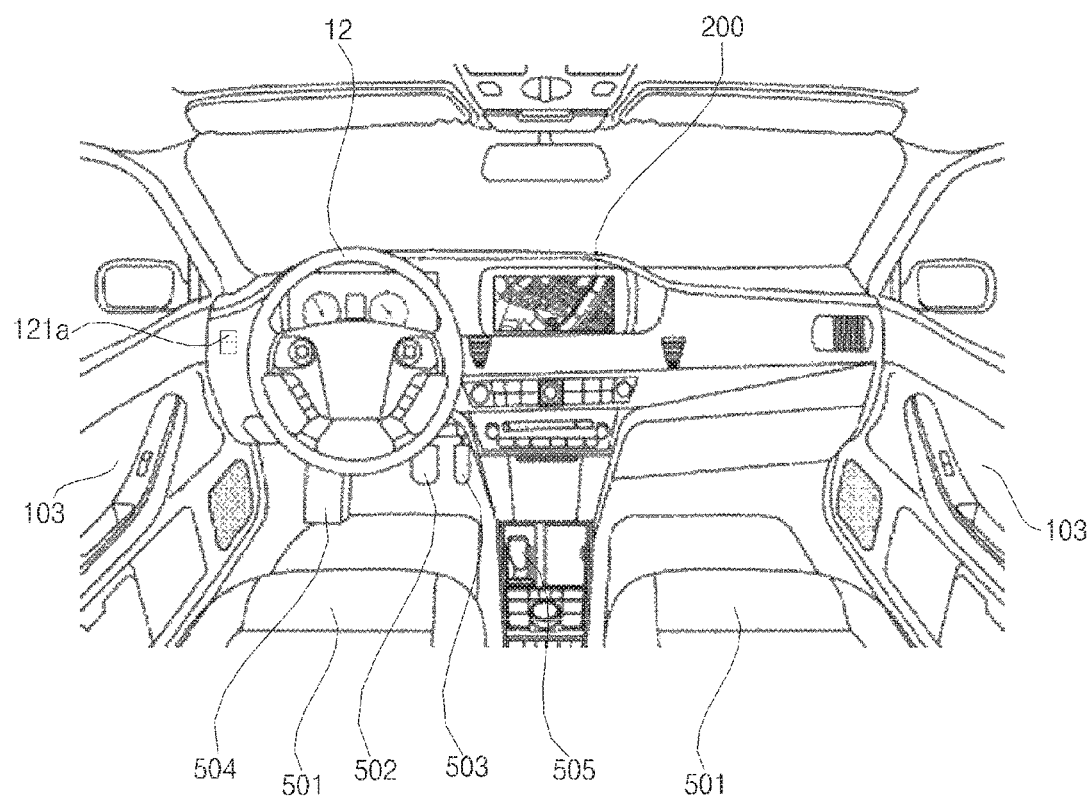
FIGS. 5A and 5B are diagrams illustrating examples of a vehicle interior viewed from different directions.
Figure 5B:
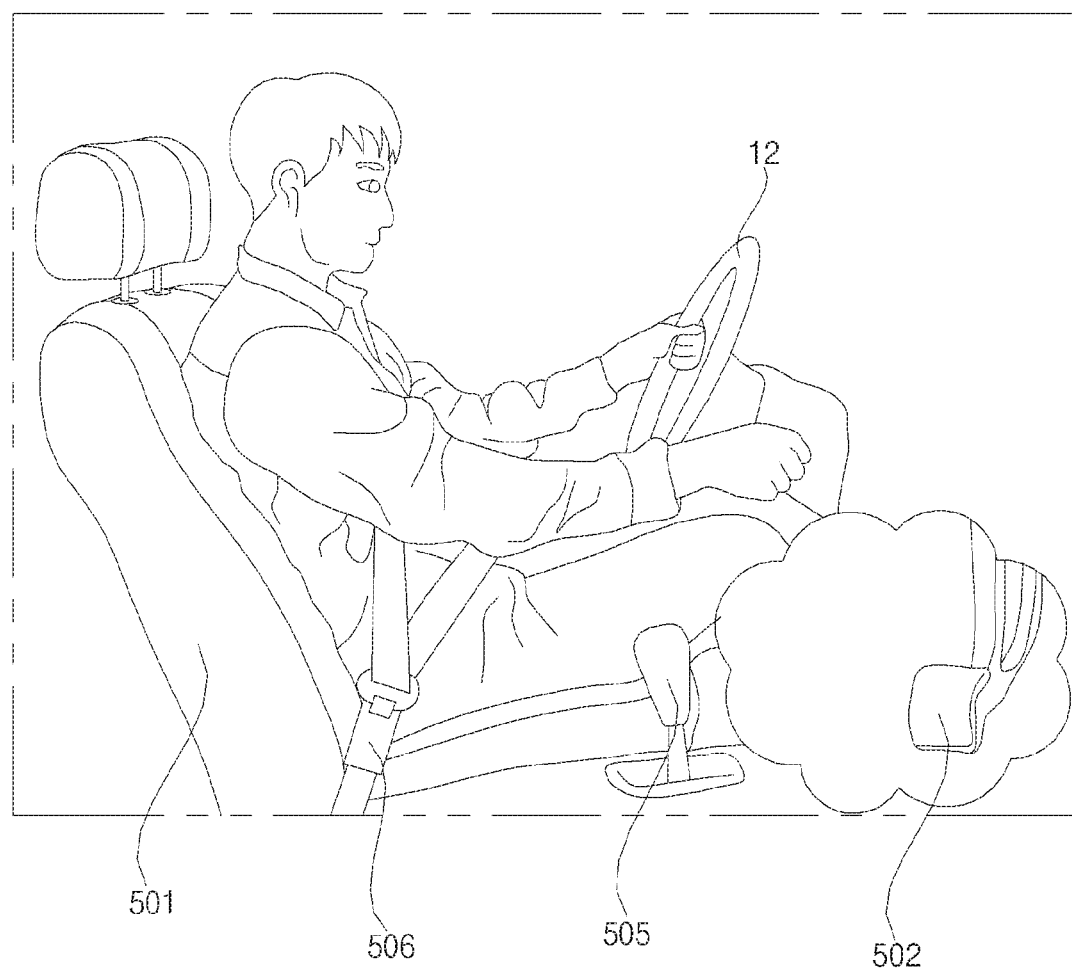

FIGS. 5A and 5B show the passenger compartment of the vehicle 100, viewed from different directions.

Specifically, FIG. 5A shows the passenger compartment when viewed from the rear side and FIG. 5B shows the driver seat when viewed from the side.

Referring to FIGS. 5A and 5B, the passenger compartment of the vehicle 100 may be provided with an AVN apparatus 200, the steering wheel 12, the doors 103, seats 501, a brake pedal 502, an accelerator pedal 503, a foot brake 504, a gearshift 505, a safety belt 506 and an input switch 121a. The input switch 121a may be included in the input unit 121 shown in FIG. 1. For example, the input switch 121a may be configured in the form of an array of a trunk opening/closing switch, a hood opening/closing switch and a fuel inlet opening/closing switch.

The AVN apparatus 200 may be provided to the center fascia corresponding to the center of the front side of the passenger compartment. In this case, the AVN apparatus 200 may display images showing execution states of various functions related to the vehicle 100 and guiding specific information requested by a passenger, such as audio screen, video screen, navigation screen, air-conditioner setting screen and around view images. The AVN apparatus 200 may output an audio message simultaneously with or separately from image display. The passenger may operate the AVN apparatus 200 through a key, a touch pad, a jog dial or the like, which is electrically connected to the AVN apparatus 200.

The sensing unit 160 may be electrically connected to the steering wheel 12, doors 103, seats 501, brake pedal 502, accelerator pedal 503, foot brake 504, gearshift 505 and safety belt 506 so as to sense states thereof. For example, the sensing unit 160 may sense a rotating direction and angle of the steering wheel 12 and sense whether the brake pedal 502 or the accelerator pedal 503 has been pushed by the driver. In addition, the sensing unit 160 may sense the position of the gearshift 505 as P/R/N/D, and sense whether the safety belt 506 of each seat 501 is fastened or released.

Signals or information indicating states of the steering wheel 12, doors 103, seats 501, brake pedal 502, accelerator pedal 503, foot brake 504, gearshift 505 and safety belt 506, sensed by the sensing unit 160, may be provided to an interface 610 of the driver assistance apparatus, which will be described later, through wired or wireless communication.

Figure 6:
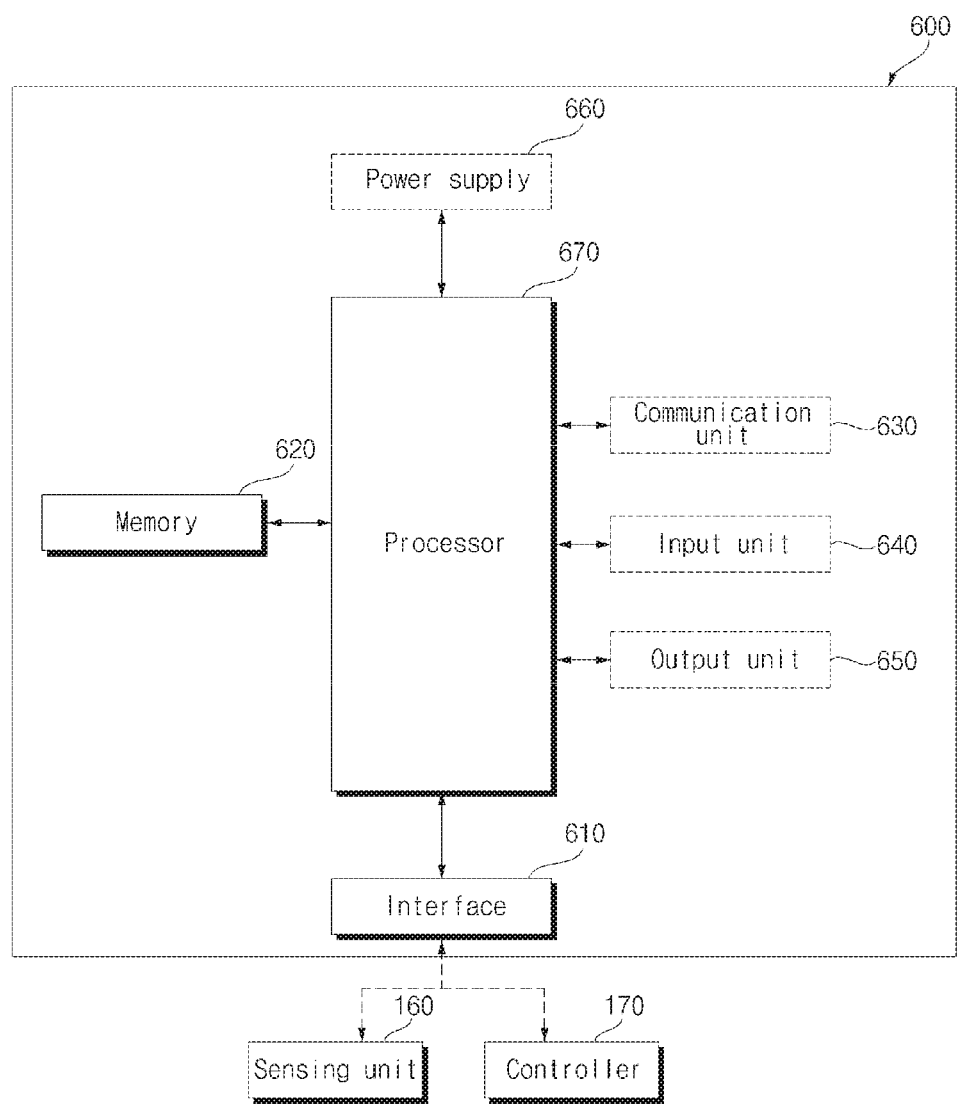
FIG. 6 is a diagram illustrating an example of a driver assistance apparatus according to an implementation.

FIG. 6 is a block diagram of a driver assistance apparatus 600 according to an implementation.

Referring to FIG. 6, the driver assistance apparatus 600 may include an interface 610, a memory 620 and at least one processor 670. In this case, the memory 620 may be integrated into the at least one processor 670. The driver assistance apparatus may further include a communication unit 630, an input unit 640 or an output unit 650.

The interface 610 may receive vehicle related data or transmit signals processed or generated by the processor to the outside. To this end, the interface 610 may perform data communication with the controller 170 and the sensing unit 160 of the vehicle according to a wired or wireless communication scheme.

The interface 610 may receive navigation information through data communication with the controller 170 or the AVN apparatus 200. Here, the navigation information may include information on a set destination, information on a route according to the destination, map information related to vehicle driving and information on the current location of the vehicle. In addition, the navigation information may include information on the location of the vehicle on a road.

The interface 610 may receive sensor information from the controller 170 or the sensing unit 160. Here, the sensor information may include at least one of vehicle direction information, vehicle position information (GPS information), heading information, speed information, acceleration information, vehicle tilt information, drive/reverse information, battery information, fuel information, tire information, vehicle lamp information, vehicle internal temperature information and vehicle internal humidity information.

Such sensor information may be acquired from a heading sensor, a yaw sensor, a gyro sensor, a position module, a front-side/rear-side sensor, a wheel sensor, a vehicle speed sensor, a vehicle tilt sensor, a battery sensor, a fuel sensor, a tire sensor, a steering sensor according to steering wheel rotation, a vehicle internal temperature sensor, a vehicle internal humidity sensor and the like.

From among sensor information, information related to a driving state of the vehicle 100 may be referred to as "driving information". For example, the driving information may include vehicle direction information, vehicle position information, heading information, speed information, vehicle tilt information, door opening information, brake pedal information, safety belt information, hood information, trunk information, ISG operation information, impact information, obstruction information and the like.

The interface 610 may receive turn signal information. The turn signal information may be a turn-on signal of a turn signal for left turn or right turn, input by the user. When left or right turn signal turn-on input is received through the user input unit (124 of FIG. 1) of the vehicle 100, the interface 610 may receive left or right turn signal information.

The interface 610 may receive vehicle speed information, steering wheel rotation angle information or gearshift information. The interface 610 may receive vehicle speed information, steering wheel rotation angle information or gearshift information, sensed through the sensing unit 160 of the vehicle 100. Here, the gearshift information may be information about the position of the gearshift of the vehicle. For example, the gearshift information may be information about the position of the gearshift which corresponds to Park (P), Reverse (R), Neutral (N), Drive (D) or one of first to multi-stage gear states.

The memory 620 may store various types of data for overall operation of the driver assistance apparatus, such as programs for processing or control of the processor 670. The memory 620 may be an information recording medium such as a ROM, RAM, EPROM, flash drive and hard drive.

The memory 620 may store data for verifying an object. For example, the memory 620 may store data for verifying an object according to a predetermined algorithm when the object is detected from an image acquired through the camera 195.

The memory 620 may store data about traffic information. For example, the memory 620 may store data for verifying traffic information according to a predetermined algorithm when the traffic information is detected from an image acquired through the camera 195.

The communication unit 630 may wirelessly exchange data with a mobile terminal or a server. Particularly, the communication unit 630 may exchange data with a mobile terminal of the vehicle driver according to a wireless communication scheme. Wireless data communication schemes may include Bluetooth, Wi-Fi Direct, Wi-Fi, APiX and NFC.

The communication unit 630 may receive weather information and traffic information, for example, TPEG (Transport Protocol Expert Group) information from the mobile terminal or the server. When the user rides in the vehicle, the mobile terminal of the user and the driver assistance apparatus may be paired automatically or according to execution of an application by the user.

The communication unit 630 may receive traffic light change information from an external server. Here, the external server may be a server located in a traffic control center.

The input unit 640 may include a plurality of buttons or a touchscreen. The user may turn on/off the driver assistance apparatus by manipulating the buttons or the touchscreen. In addition, various input operations may be performed.

The output unit 650 outputs information corresponding to an operation performed by the driver assistance apparatus. The output unit 650 may output visual, auditory or tactile feedback according to current operation of the driver assistance apparatus.

A power supply 660 may supply power necessary for operations of components under the control of the processor 670. Particularly, the power supply 660 may provide electric energy of a battery included therein to components of the driver assistance apparatus. If the driver assistance apparatus is provided with electric energy from a battery included in the vehicle, the power supply 660 may be omitted.

The processor 670 controls overall operation of each unit of the driver assistance apparatus. The processor 670 may be implemented using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors) and other electrical units for executing the corresponding functions.

The processor 670 is electrically connected to ISG (Idle Stop and Go) and the interface 610. The processor 670 may check the state of the vehicle 100 on the basis of electrical signals provided by the ISG and the interface 610. Specifically, the processor 670 may check whether the vehicle is in a first state in which ISG is turned on or a second state in which the gearshift of the vehicle 100 is positioned in modes other than a parking (P) mode and the engine of the vehicle is turned on. If the vehicle 100 is stopped in the first state or in the second state, the processor 670 performs a stopping operation for stop control of the vehicle 100 on the basis of driving information. Here, the stopping operation for stop control of the vehicle 100 may be an operation of maintaining the vehicle 100 in a stopped state, thereby limiting a movement of the vehicle.

Stopping operations include at least one of an operation of blocking a disabling operation of the ISG, an operation of turning off an engine of the vehicle 100, or an operation of activating a parking brake of the vehicle, such as an electronic parking brake (EPB) or a foot brake. When performing the operation of blocking a disabling operation of the ISG, the ISG is maintained in an enabled state so as to, for example, automatically shut off the vehicle engine according to ISG functionality. In such a scenario, the driver assistance apparatus may block or override any operations that attempt to disable the ISG functionality, which may introduce risk by allowing the driver to mistakenly start driving the vehicle in a dangerous condition. When a parking brake, such as the EPB or foot brake, is activated, the vehicle 100 may be maintained in a stopped state, so that the vehicle wheels do not rotate, according to braking power of the EPB or foot brake even if the engine of the vehicle 100 is turned on.

The processor 670 may determine whether one or more conditions are satisfied before performing the stopping operation. For example, the processor 670 may determine whether a first stopping condition and a second stopping condition are satisfied based on the driving information. For example, the first stopping condition may be a stop preparation condition indicating that the vehicle is at risk to enter a state in which the stopping operation should be performed, and the second stopping condition may be a stop execution condition indicating that the vehicle has entered a state in which the stopping operation should be performed. As described above, the driving information may include information related to driving. The first stopping condition, or the stop preparation condition, may be a predetermined condition for situations in which there is a high possibility that the vehicle 100 in a stopped state will begin to move. The second stopping condition, or the stop execution condition, may be a predetermined condition for initiating the stopping operation for stop control of the vehicle 100.

If the first and second stop conditions, such as the stop preparation condition and the stop execution condition, are sequentially satisfied, then the at least one processor 670 may perform a stopping operation. For example, the at least one processor 670 may determine that the first and second stop conditions are sequentially satisfied by determining that the first stop condition is satisfied at a first time, and the second stop condition is satisfied at a second time subsequent to the first time.

In one implementation, the first stopping condition, or the stop preparation condition, for the vehicle may include at least one of (i) opening of the driver side door, (ii) release of the driver seat safety belt, (iii) opening of the trunk, (iv) opening of the hood, (v) detection of an obstruction around the vehicle, or (vi) occurrence of a crash accident involving the vehicle. In such scenarios, the second stopping condition, or the stop execution condition, may include release of the brake pedal. For example, when the brake pedal is released upon sensing of opening of the hood, the vehicle 100 moves forward and thus a crash may occur. In this case, the processor 670 may control the vehicle 100 to be maintained in the stopped state by performing a stopping operation, such as turning on the ISG to automatically turn off the vehicle engine.

In an implementation, the first stopping condition, or the stop preparation condition, may include (i) shifting to Neutral (N) or Reverse (R) on an uphill road or (ii) shifting to Neutral (N) or Drive (D) on a downhill road. In this case, the second stopping condition, or the stop execution condition, may include release of the brake pedal. For example, if the brake pedal is released when the gearshift is shifted to Reverse (R) on an uphill road, the vehicle 100 may move backward and thus may hit a person behind the vehicle. In this case, the processor 670 may control the vehicle 100 to be maintained in the stopped state by performing a stopping operation such as activation of a parking brake, such as the EPB. The processor 670 may control braking power of the EPB or foot brake according to the gradient of an uphill road or a downhill road. For example, since risk of an accident of the vehicle 100 is high when the gradient of an uphill road or a downhill road is high, the processor 670 may increase braking power.

In one implementation, the first stopping condition, or the stop preparation condition, may include a condition that the brake pedal is not released from the last time the vehicle 100 is stopped. The second stopping condition, or the stop execution condition, may include a condition that the vehicle 100 travels at a predetermined speed or higher for a predetermined distance or longer. In such scenarios, even if the driver continuously depresses on the brake pedal, the vehicle 100 may move forward or in reverse for various reasons such as aging of the brake apparatus. In this case, the processor 670 may stop the vehicle 100 by turning off the engine or generating additional braking power through the EPB or foot brake.

In an implementation, when at least one door of the vehicle 100 is open, the processor 670 may detect an object caught in the open door. For example, driving information received through the interface 610 may include a torque value measured by a torque sensor corresponding to the open door. The processor 670 may determine that a person is caught between the open door and the body of the vehicle based on the torque value of the open door exceeding a threshold value. In such scenarios, the processor 670 may perform a stopping operation for the vehicle upon detection of an object caught in the open door.

In an implementation, the processor 670 may determine whether a passenger exits the vehicle 100 on the basis of whether any door of the vehicle is open. For example, the processor 670 may determine that the driver exits the vehicle based on the driver's seat door being open while the driver and a passenger ride in the vehicle 100, and may determine that a passenger exits the vehicle based on a door other than the driver's seat door being open.

If the trunk of the vehicle 100 is open, the gearshift is shifted to Reverse (R) and the passenger exits the vehicle 100, the processor 670 may perform a stopping operation according to whether an object moving behind the vehicle 100 is detected. For example, the interface 610 may receive sensing information from at least one sensor provided to the rear side of the vehicle 100 and the processor 670 may detect an object moving behind the vehicle 100 on the basis of the sensing information.

As an example, when a pedestrian or another vehicle is moving within a predetermined distance from the read side of the vehicle 100, the processor 670 may forcibly stop the vehicle 100 in order to prevent an accident due to driving in reverse.

As another example, if the trunk of the vehicle 100 is open, the gearshift is shifted to Neutral (N), and the driver releases the brake pedal when the passenger exits the vehicle 100, the vehicle 100 moves in reverse and thus may hit the passenger. Accordingly, the processor 670 performs a stopping operation upon release of the brake pedal when an object moving behind the vehicles is detected.

In one implementation, the interface 610 may receive an outdoor image provided by the cameras 161 and 195 included in the vehicle 100. The processor 670 may detect at least one object from the outdoor image and acquire information on the detected object. Here, the information on the detected object may include at least one of the type, position, speed, shape and size of the detected object. If the detected object includes an obstruction, the processor 670 may perform a stopping operation on the basis of the relative position of the obstruction with respect to the vehicle 100. Here, the obstruction may include another vehicle, a pedestrian, a tree, a fallen object and a structure, which may collide with the vehicle 100.

For example, if the brake pedal is released when the obstruction is located within a predetermined distance from the front side of the vehicle 100 and the gearshift is shifted to Drive (D), the vehicle 100 may move forward to collide with the obstruction. To prevent this, the processor 670 may perform a stopping operation. Similarly, if the obstruction is located within a predetermined distance from the rear side of the vehicle 100 and the gearshift is shifted to Reverse (R), the processor 670 may perform a stopping operation.

In one implementation, the processor 670 may check whether a door of the vehicle 100 is open on the basis of whether each door of the vehicle 100 is open and an opening angle of an open door, included in the driving information. If an obstruction is located at the side of an open door, the processor 670 may perform a stopping operation on the basis of the opening angle of the open door. For example, the processor 670 may perform the stopping operation when the opening angle of the open door exceeds a threshold value since risk of collision with the obstruction increases as the opening angle increases.

In one implementation, the driving information may include information on whether each window of the vehicle 100 is open. For example, in a scenario in which at least one window of the vehicle 100 is open and an obstruction is located at the side of the open window, the system may check whether the object detected from the outdoor image includes a part of the body of the passenger, which protrudes through the open window. For example, when the passenger puts their head or hand out of the open window, the processor 670 may detect the head or hand of the passenger from the outdoor image. When the part of the body of the passenger, which protrudes through the open window, is detected from the outdoor image, the processor 670 may perform a stopping operation on the basis of the protruding length of the part of the body of the passenger. If the protruding part of the body of the passenger moves inside the open window, the processor 670 may stop the stopping operation.

When the processor 670 performs the stopping operations in the aforementioned situations, the processor 670 may provide messages about the operations through an output device included in the vehicle 100.

Figure 7A:
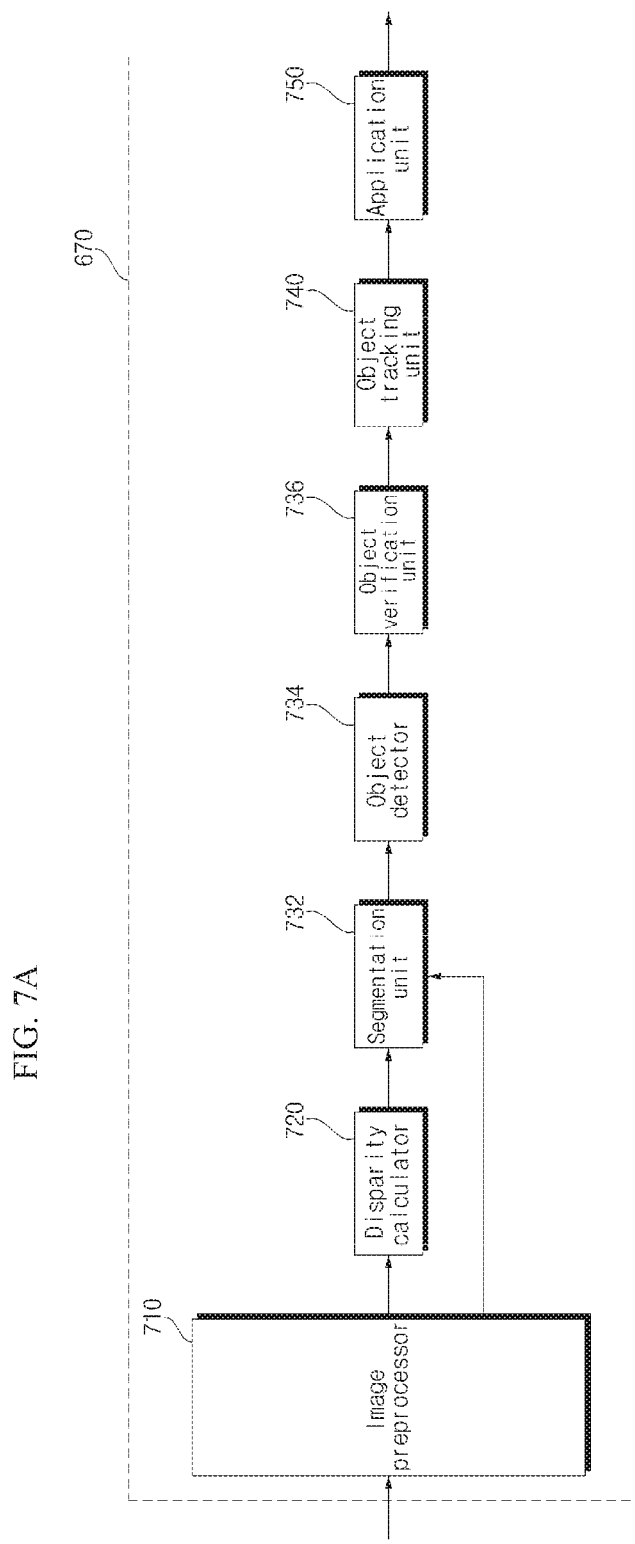
FIGS. 7A and 7B are block diagrams illustrating examples of a processor shown in FIG. 6.
Figure 7B:
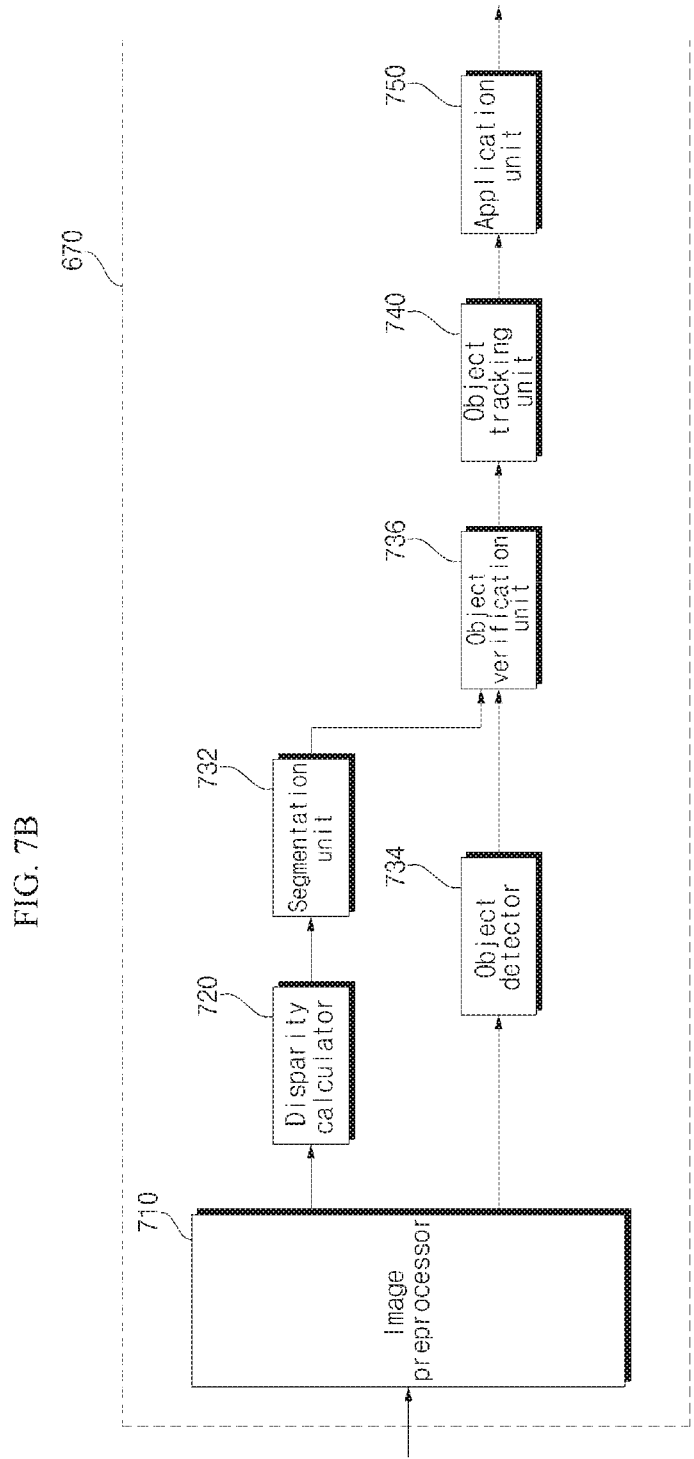

FIGS. 7A and 7B are block diagrams of the processor 670 shown in FIG. 6.

Referring to FIG. 7A, the processor 670 may include an image preprocessor 710, a disparity calculator 720, a segmentation unit 732, an object detector 734, an object verification unit 736, an object tracking unit 740 and an application unit 755.

The image preprocessor 710 may receive an image from the camera module 195 shown in FIG. 4A and preprocess the image. Here, the image may be at least one of a mono image, a stereo image, an around view image and an omnidirectional image.

Specifically, the image preprocessor 710 may perform noise reduction, rectification, calibration, color enhancement, color space conversion (CSC), interpolation, camera gain control and the like on the image.

Accordingly, a clearer image than images photographed by the camera module 195 may be acquired.

The disparity calculator 720 receives a plurality of images or a generated around view image, processed in the image preprocessor 710, performs stereo matching on a plurality of mono images or stereo images, sequentially received for a predetermined time, and acquires a disparity map according to stereo matching. In this manner, the disparity calculator 720 may acquire disparity information about surroundings of the vehicle.

Here, stereo matching may be performed per pixel of images or on a block by block basis. The disparity map refers to a map that represents binocular parallax information of images as numerical values.

A segmentation unit 732 may perform segmentation and clustering on images on the basis of the disparity information from the disparity calculator 720.

Specifically, the segmentation unit 732 may separate a background and a foreground from at least one image on the basis of the disparity information.

For example, the segmentation unit 732 may classify a region corresponding to disparity information less than a predetermined value in the disparity map as a background and exclude the corresponding region from an object detection target. Accordingly, a foreground may be relatively separated.

Alternatively, the segmentation unit 732 may classify a region corresponding to disparity information that exceeds the predetermined value in the disparity map as a foreground and extract the foreground, thereby separating the foreground from the background.

When the foreground and the background are separated on the basis of the disparity information extracted based on images, a signal processing speed may be increased and the quantity of processed signals may be reduced during the following object detection process.

The object detector 734 may detect an object on the basis of image segmentation of the segmentation unit 732.

The object detector 734 may detect an object from at least one image on the basis of the disparity information.

Specifically, the object detector 734 may detect an object from at least one image. For example, the object detector 734 may detect an object from a foreground separated according to image segmentation.

The object verification unit 736 may classify and verify the detected object. To this end, the object verification unit 736 may use an identification method using a neural network, a support vector machine (SVM) method, an identification method according to AdaBoost using Haar-like characteristics, histograms of oriented gradients (HOG) or the like.

The object verification unit 736 may verify the detected object by comparing information on the detected object with reference information (e.g. characteristic information per object type) stored in the memory.

For example, the object verification unit 736 may verify vehicles, lanes, road surfaces, road signs, danger areas, tunnels and the like, located around the corresponding vehicle.

The object tracking unit 740 may track the verified object. For example, the object tracking unit 740 may verify an object included in sequentially acquired stereo images, calculate motion or a motion vector of the verified object and track movement of the object on the basis of the calculated motion or motion vector. Accordingly, the object tracking unit 740 may track vehicles, lanes, road surfaces, road signs, danger zones, tunnels and like around the corresponding vehicle.

The application unit 750 may calculate a degree of car accident risk of the vehicle 100 on the basis of object information on various objects around the vehicle (e.g., other vehicles, lanes, road surfaces, road signs and the like). In addition, the application unit 750 may calculate possibility of rear-end collision with the detected object, slip of the vehicle and the like on the basis of the object information.

Furthermore, the application unit 750 may output messages for informing the user of the information on the calculated hazard, rear-end collision possibility or vehicle slip on the basis of the calculated hazard, rear-end collision possibility or vehicle slip. In addition, the application unit 750 may generate a control signal for attitude control or driving control of the vehicle 100 as vehicle control information.

The processor 670 shown in FIG. 7B differs from the processor 670 shown in FIG. 7A in terms of signal processing order. A description will be given of only such difference.

The object detector 734 may receive mono images, stereo images, around view images or omnidirectional images and detect objects included in the received images. Distinguished from FIG. 8A, the object detector 734 may directly detect objects from the mono images, stereo images, around view images or omnidirectional images on the basis of disparity information, rather than detecting an object from a segmented image.

The object verification unit 736 classifies and verifies a detected and separated object on the basis of image segmentation of the segmentation unit 732 and an object detected by the object detector 734.

To this end, the object verification unit 736 may use an identification method using a neural network, a support vector machine (SVM) method, an identification method according to AdaBoost using Haar-like characteristics, histograms of oriented gradients (HOG) or the like.

Figure 8A:
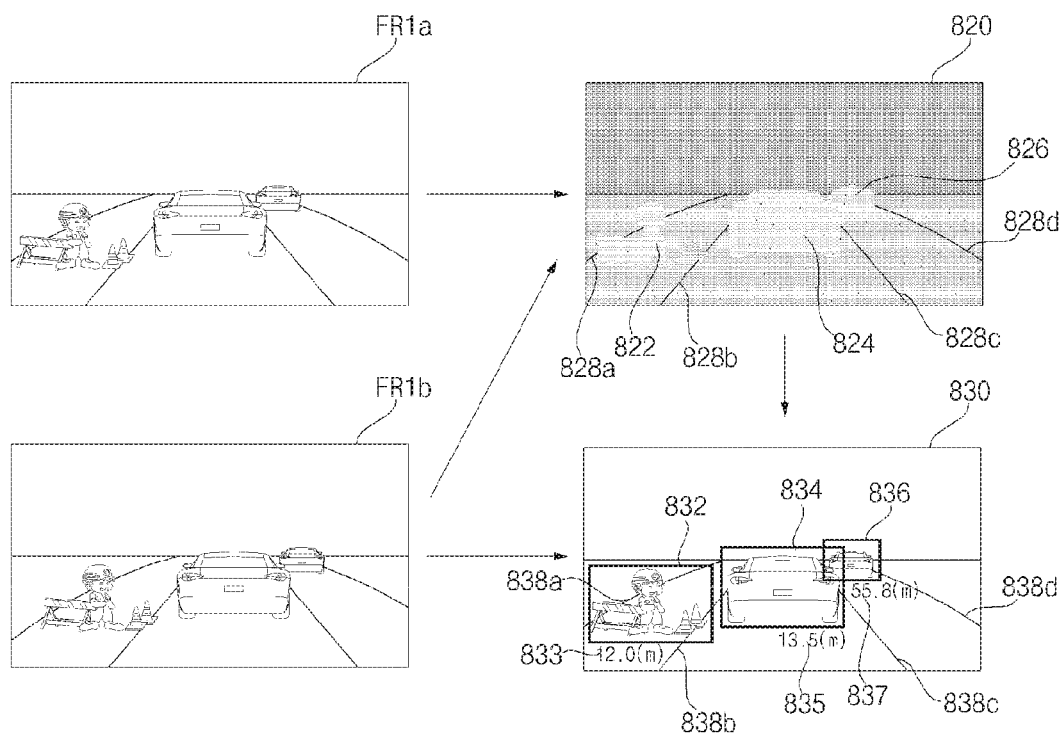
FIGS. 8A and 8B are diagrams illustrating examples of operations of the processor shown in FIG. 6 to detect an object from an outdoor image.
Figure 8B:
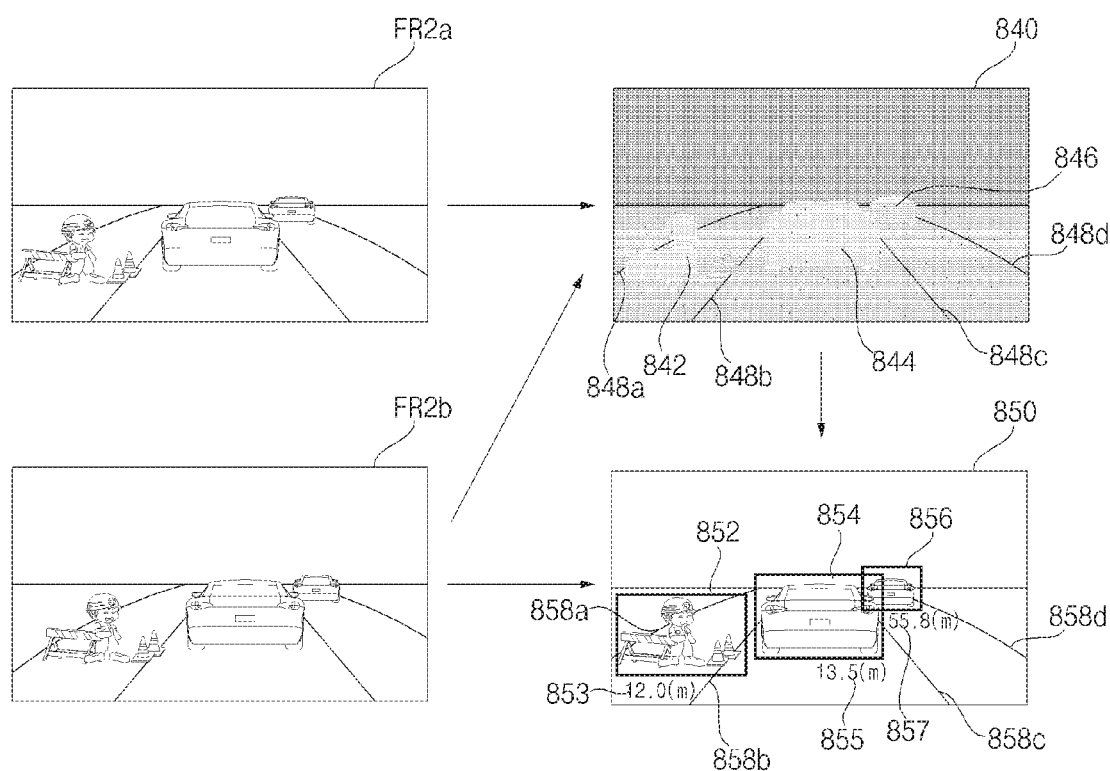

FIGS. 8A and 8B illustrate operations of the processor 670 shown in FIG. 6 to detect an object.

FIGS. 8A and 8B show operations of the processor 670 to detect an object on the basis of stereo images respectively acquired through the camera 195 shown in FIG. 4C in first and second frame intervals.

Referring to FIG. 8A, the camera 195 acquires stereo images F11a and F11b in the first frame interval.

The disparity calculator 720 included in the processor 670 receives stereo images FR1a and FR1b, which are processed by the image preprocessor 710, and performs stereo matching on the received stereo images FR1a and FR1b so as to acquire a disparity map 820.

The disparity map 820 represents levels of disparity between the stereo images FR1a and FR1b. A distance to the vehicle is recognized to be shorter as the disparity level increases and is recognized to be longer as the disparity level decreases.

When the disparity map is displayed, a higher disparity level may be represented as higher brightness and a lower disparity level may be represented as lower brightness.

In FIG. 8A, first to fourth lanes 828a, 828b, 828c and 828d, a construction zone 822, a first preceding vehicle 824 and a second preceding vehicle 826 respectively have disparity levels corresponding thereto in the disparity map 820.

The segmentation unit 732, the object detector 734 and the object verification unit 736 respectively perform segmentation, object detection and object verification on at least one of the stereo images FR1a and FR1b on the basis of the disparity map 820.

FIG. 8A shows an image 830 obtained by performing object detection and verification on the second stereo image FR1b on the basis of the disparity map 820.

The first to fourth lanes 838a, 838b, 838c and 838d, the construction zone 822, the first preceding vehicle 834 and the second preceding vehicle 836 are displayed in the image 830 such that they are separated from a background.

Referring to FIG. 8B, the camera 195 acquires stereo images in the second frame interval following the first frame interval.

The disparity calculator 720 included in the processor 670 receives stereo images FR2a and FR2b, which are processed by the image preprocessor 710, and performs stereo matching on the received stereo images FR2a and FR2b so as to acquire a disparity map 840.

In FIG. 8B, first to fourth lanes 848a, 848b, 848c and 848d, a construction zone 842, a first preceding vehicle 844 and a second preceding vehicle 846 respectively have disparity levels corresponding thereto in the disparity map 840.

The segmentation unit 732, the object detector 734 and the object verification unit 736 respectively perform segmentation, object detection and object verification on at least one of the stereo images FR2a and FR2b on the basis of the disparity map 840.

FIG. 8B illustrates an image 850 obtained by performing object detection and verification on the second stereo image FR2b using the disparity map 840.

The first to fourth lanes 848a, 848b, 848c and 848d, the construction zone 842, the first preceding vehicle 844 and the second preceding vehicle 846 are displayed in the image 850 such that they are separated from the background.

The object tracking unit 740 tracks the objects by comparing the sequentially generated images 830 and 850.

Specifically, the object tracking unit 740 may track movement of the objects verified in FIGS. 8A and 8B on the basis of motions or motion vectors of the objects. Accordingly, the object tracking unit 740 may track the lanes, the construction zone, the first preceding vehicle and the second preceding vehicle, which are located around the vehicle 100.

Figure 9:
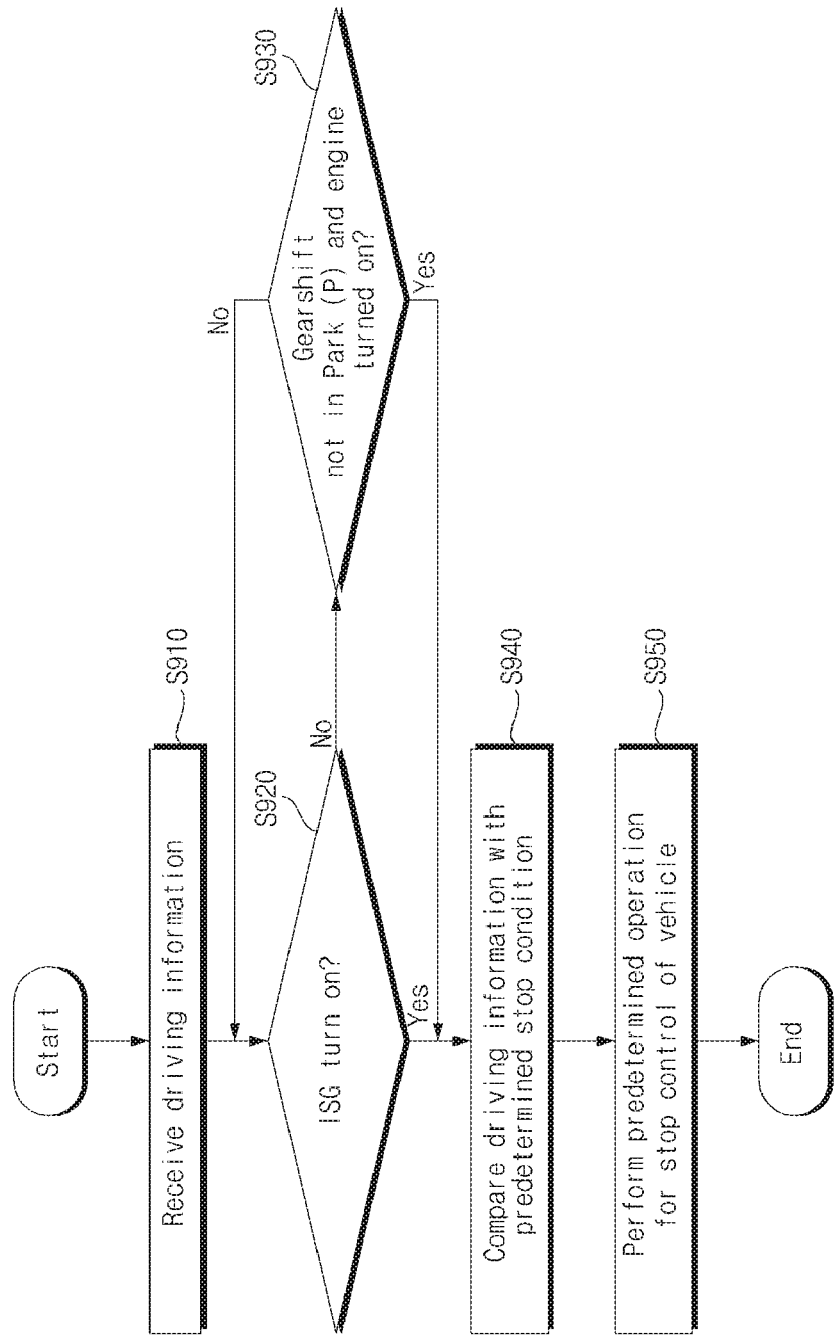
FIG. 9 is a flowchart illustrating an example of a process that may be performed by the driver assistance apparatus according to an implementation.

FIG. 9 is a flowchart of a process S900 that may be performed by the driver assistance apparatus 600 according to an implementation. It is assumed that the process S900 which will be described below is initiated when the vehicle 100 is stopped. For example, the process S900 may be initiated from when the vehicle 100 is temporarily stopped for parking or waiting for a signal.

Referring to FIG. 9, the driver assistance apparatus 600 may receive driving information from the vehicle (S910).

Specifically, the processor 670 may receive driving information, which is information related to a driving state of the vehicle 100, through the interface 610 electrically connected to the controller or the sensing unit 160 of the vehicle 100 in real time or periodically. For example, the interface 610 may provide data transmitted from the sensing unit 160 to the processor 670 at the request of the processor 670 or irrespective of a request of the processor 670. Here, the driving information may include at least ISG operation information and engine operation information of the vehicle 100. The driving information may include data indicating whether the engine of the vehicle is turned on or turned off. When the engine of the vehicle 100 is turned off, the driving information may include data indicating whether the engine of the vehicle 100 is turned off due to ISG turn on. Accordingly, when the engine of the vehicle 100 is turned off, the processor 670 may determine whether turn off of the engine of the vehicle 100 corresponds to temporary turn off due to ISG turn on or complete turn off according to a command of the driver.

In addition, the driving information may include vehicle direction information (e.g. yaw rate), geographical position information of the vehicle 100, vehicle heading information, vehicle speed information, vehicle tilt information, information on door opening/closing, brake pedal information, information on fastening/release of the safety belt 506, information on hood opening/closing, information on trunk opening/closing, gearshift position information, ISG operation information, impact information (e.g. collision part and impulse) and obstruction information (e.g. obstruction position and obstruction type). The driving information may further include an outdoor image, an object sensing signal and navigation information as necessary. Here, the outdoor image may be photographed by the aforementioned cameras 161 and 195.

The driver assistance apparatus 600 may determine whether the vehicle 100 is in a first state in which ISG is turned on using the driving information (S920). When ISG is turned on, the driver assistance apparatus 600 may determine whether the vehicle 100 is in a second state in which the gearshift 5050 is positioned at stages (e.g. R, N or D) other than P stage and the engine of the vehicle 100 is turned on (S930).

Upon determining that the vehicle 100 is in the first state in step S920 or determining that the vehicle 100 is in the second state in step S930, the driver assistance apparatus 600 may compare the driving information with predetermined stop conditions (S940). The predetermined stop conditions may be conditions for determining whether to perform an operation associated with a function of stopping the vehicle 100, for example, decreasing the speed to 0. Specifically, the stop conditions may be composed of one or more conditions associated with risk of car accidents such as collision when the vehicle 100 is restarted from a stopped state.

One, two or more stop conditions may be present. In the case of two or more stop conditions, the stop conditions may be divided into two or more groups. If one group of stop conditions is satisfied, the processor 670 may check whether the other group is satisfied. As such, the processor 670 may sequentially determine whether respective groups of stop conditions are satisfied. For example, a plurality of stop conditions may be divided into a stop preparation condition and a stop execution condition and the processor 670 may check whether the stop execution condition is satisfied after the stop preparation condition is met. In this case, the driver assistance apparatus 600 may perform following step S950 only when the stop preparation condition and the stop execution condition are sequentially satisfied.

The driver assistance apparatus 600 may perform a stopping operation for stop control of the vehicle 100 on the basis of a comparison result of step S940 (S950). Here, the stopping operation is an operation for maintaining the last stopped state of the vehicle 100 and may include at least one of (i) blocking a disabling operation of the ISG, (ii) turning off the engine of the vehicle 100, (iii) activation of the EPB, or (iv) activation of the foot brake 504, for example. When the operation of (i) blocking a disabling operation of the ISG or (ii) turning off the engine of the vehicle 100 is performed, the engine is stopped and thus movement of the vehicle 100 may be restricted. When (iii) activation of the EPB or (iv) activation of the foot brake 504 is performed, movement of the vehicle 100 may be restricted by braking power of a predetermined level or higher.

A detailed description will be given of operations of the driver assistance apparatus 600 to stop the vehicle 100 in various situations with reference to FIGS. 10 to 29.

Figure 10:
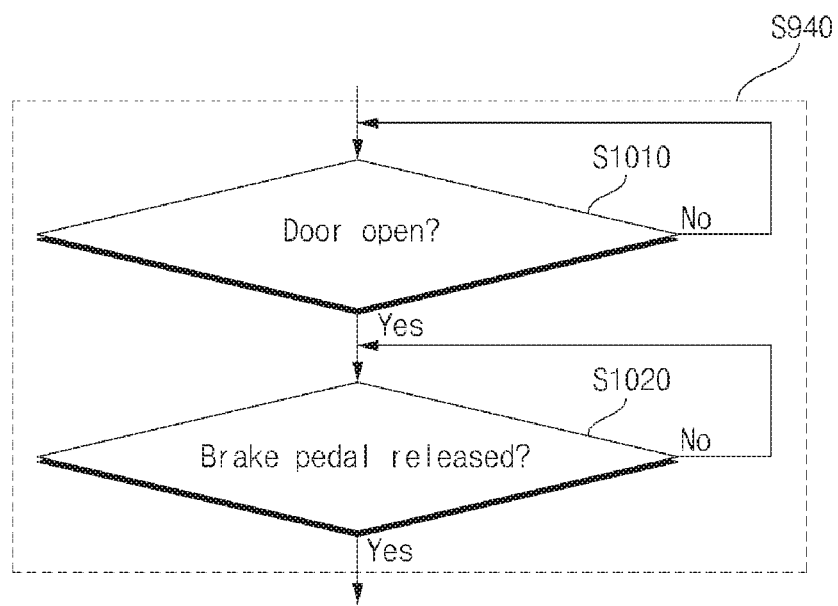
FIG. 10 is a flowchart illustrating an example of a process related to step S940 of FIG. 9.
Figure 11:
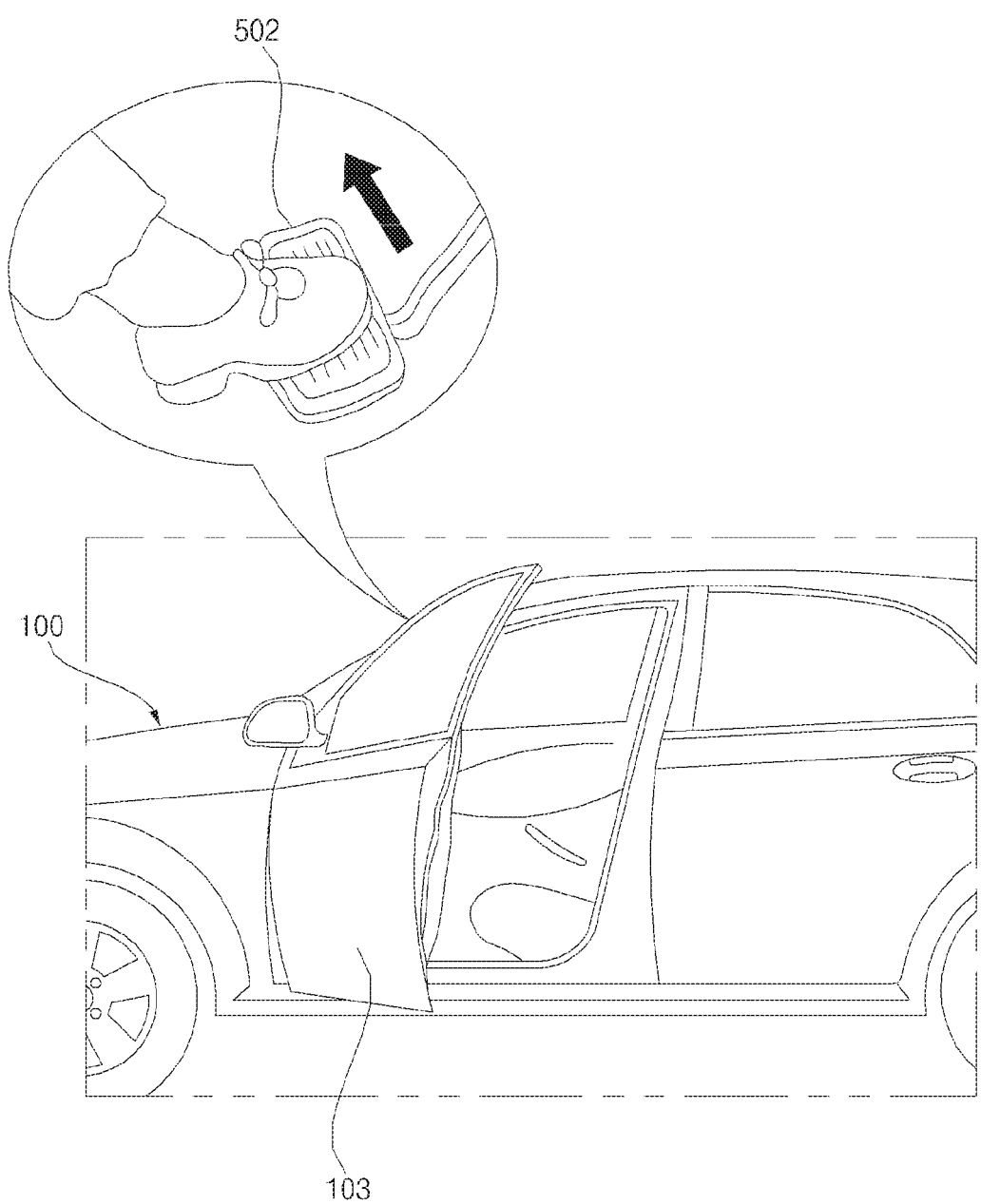
FIG. 11 is a diagram illustrating an example of an operation of the driver assistance apparatus according to the process of FIG. 10.

FIG. 10 is a flowchart of a process related to step S940 of FIG. 9 and FIG. 11 illustrates an operation of the driver assistance apparatus 600 according to the process of FIG. 10.

Referring to FIGS. 10 and 11, the processor 670 may determine whether at least one of the doors 103 of the vehicle 100 is open (S1010).

Specifically, the vehicle 100 includes at least the door 103 at the driver seat 501 and may further include additional doors 103 according to the size and use of the vehicle 100. A door opening/closing sensor for sensing whether the door 103 of the vehicle 100 is open or closed may be provided per door 103. The door opening/closing sensor may be included in the sensing unit 160 shown in FIG. 1.

While FIG. 11 shows that driver side door 103 is open, the processor 670 may check whether a door other than the driver side door 103 is open on the basis of a sensing signal provided by the door opening/closing sensor.

A door is open when a person enters or exits the vehicle. When the person enters or exits the vehicle through the open door, the vehicle 100 may move forward or in reverse if the brake pedal 502 is released even when the vehicle 100 is stopped, which may threaten the safety of the person. Accordingly, opening of the door 103 may be classified as a stop preparation condition.

Upon determining that at least one of the doors 103 of the vehicle 100 is open, the processor 670 may determine whether the brake pedal 502 has been released (S1020). Release of the brake pedal 502 may be a stop execution condition. Since opening of the door 103 corresponding to a stop preparation condition has been satisfied, the processor 670 may perform step S950 if release of the brake pedal 502 corresponding to a stop execution condition is met.

When the vehicle 100 includes a plurality of doors 103, the processor 670 may differentially perform stopping operations according to the number of open doors 103. For example, when only one door 103 is open, the processor 670 performs the operation of turning off the engine of the vehicle 100. When two or more doors are simultaneously open, the processor 670 additionally performs the EPB activation operation.

Figure 12:
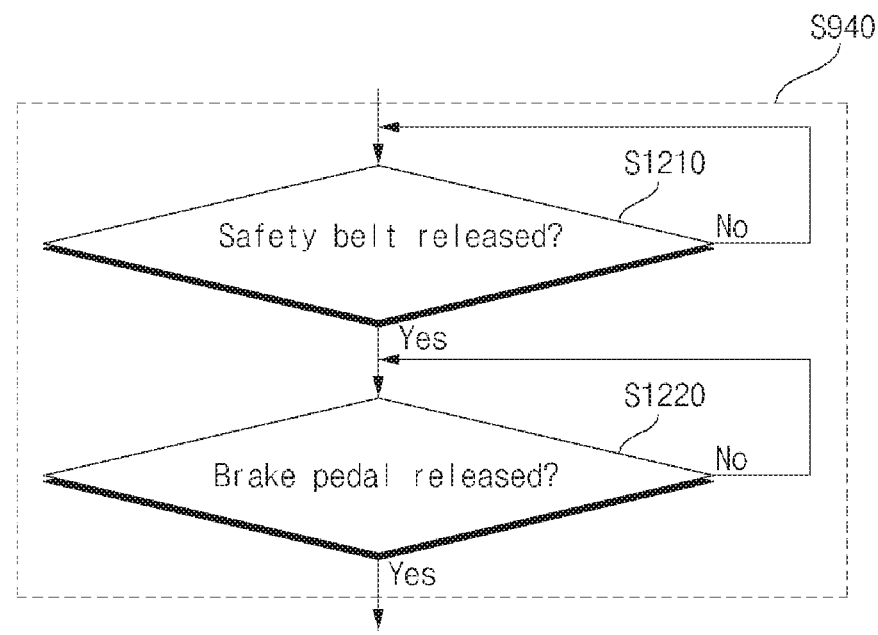
FIG. 12 is a flowchart illustrating an example of a process related to step S940 of FIG. 9.
Figure 13:
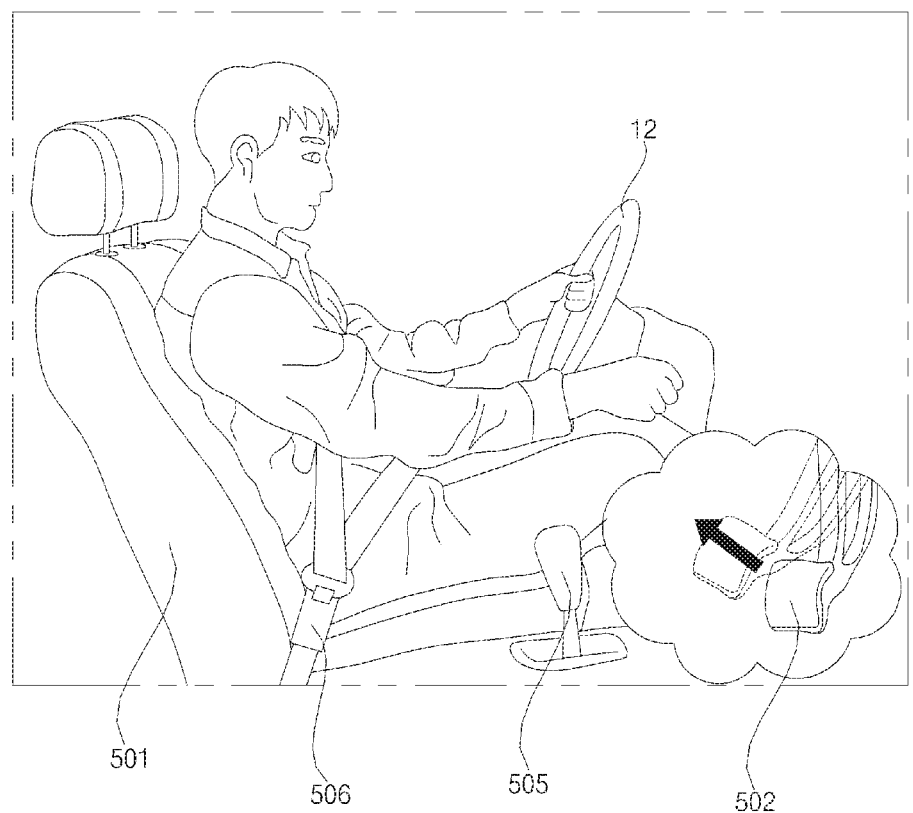
FIG. 13 is a diagram illustrating an example of an operation of the driver assistance apparatus according to the process of FIG. 12.

FIG. 12 is a flowchart of a process related to step S940 of FIG. 9 and FIG. 13 illustrates an operation of the driver assistance apparatus 600 according to the process of FIG. 12.

Referring to FIGS. 12 and 13, the processor 670 may determine whether at least one safety belt 506 of the vehicle 100 is released (S1210). The safety belt 506 may be provided per seat of the vehicle 100. For example, the safety belt 506 may be a 3-point safety belt including a pelvic belt and a shoulder belt.

Specifically, the vehicle 100 includes at least the safety belt 506 at the driver seat 501 and may further include additional safety belts 506 according to the size and use of the vehicle 100. A safety belt sensor for sensing whether the safety belt 506 of the vehicle 100 is fastened or released may be provided per safety belt 506. The safety belt sensor may be included in the sensing unit 160 shown in FIG. 1.

While FIG. 13 shows that the safety belt 506 of the driver seat 501 is released, the processor 670 may check whether a safety belt other than the driver seat safety belt 506 is fastened/released on the basis of a sensing signal provided by the safety belt sensor.

The safety belt 506 is released when a passenger on the seat corresponding to the released safe belt exits the vehicle 100. When the person exits the vehicle, the vehicle 100 may move forward or in reverse if the brake pedal 502 is released even when the vehicle 100 is stopped, which may threaten the safety of the passenger. Accordingly, release of the safety belt 506 may be classified as a stop preparation condition.

Upon determining that at least one safety belt 506 of the vehicle 100 is released, the processor 670 may determine whether the brake pedal 502 has been released (S1220). Release of the brake pedal 502 may be a stop execution condition. Since release of the safety belt 506 corresponding to a stop preparation condition has been satisfied, the processor 670 may perform step S950 if release of the brake pedal 502 corresponding to a stop execution condition is met.

When the vehicle 100 includes a plurality of safe belts 506, the processor 670 may differentially perform stopping operations according to the number of safety belts 506. For example, when one safety belt 506 is released, the processor 670 performs the operation of turning off the engine of the vehicle 100. When two or more safety belts are released, the processor 670 additionally performs the EPB activation operation.

Figure 14:
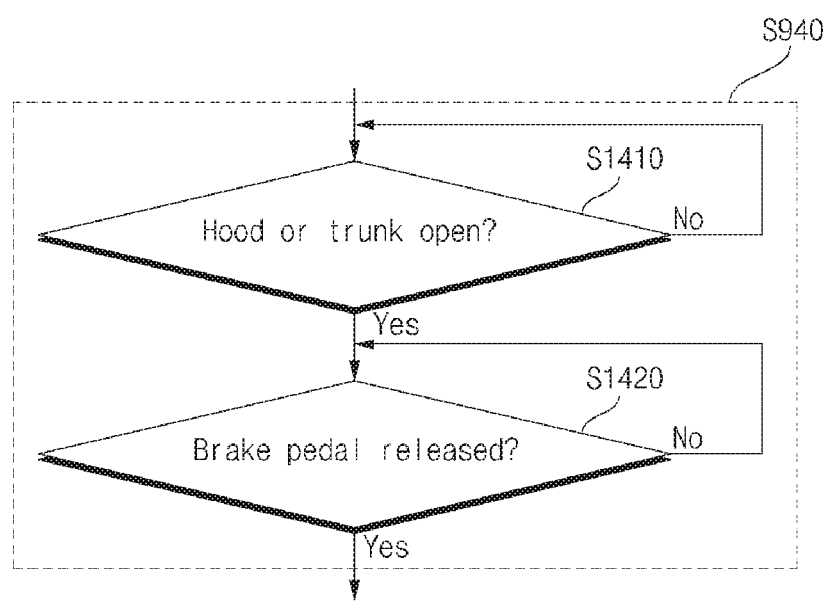
FIG. 14 is a flowchart illustrating an example of a process related to step S940 of FIG. 9.
Figure 15:
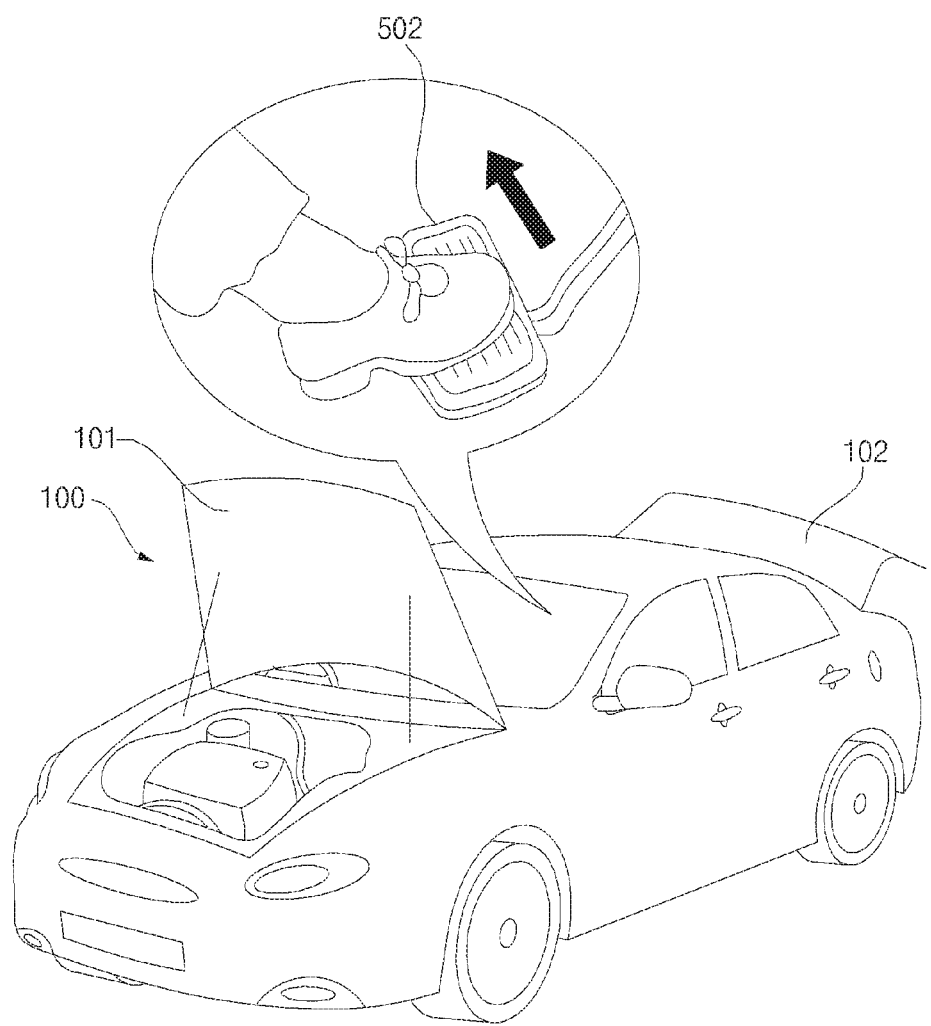
FIG. 15 is a diagram illustrating an example of an operation of the driver assistance apparatus according to the process of FIG. 14.

FIG. 14 is a flowchart of a process related to step S940 of FIG. 9 and FIG. 15 illustrates an operation of the driver assistance apparatus 600 according to the process of FIG. 14.

Referring to FIGS. 14 and 15, the processor 670 may determine whether at least one of the hood 101 and the trunk 102 of the vehicle 100 is open (S1410).

Specifically, the vehicle 100 includes the hood 101 for shielding the engine compartment and the trunk 102 for loading baggage. A sensor for sensing whether the hood 101 or the trunk 102 is open or closed may be included in the sensing unit 160 shown in FIG. 1.

A passenger may open the trunk 102 by pushing a trunk opening switch provided to the passenger compartment of the vehicle 100 or open the hood 101 by pressing a hood opening switch.

While FIG. 15 shows that both the trunk 102 and the hood 101 are open, the processor 670 may perform the corresponding operation when only one of the trunk 102 and the hood 101 is open.

The hood 101 may be open when the engine compartment needs to be checked and the trunk 102 may be open when a passenger attempts to load baggage. In such scenarios, the possibility that a person is located close to the vehicle 100 is high.

When the passenger opens the hood 101 or the trunk 102, the vehicle 100 may move forward or in reverse if the brake pedal 502 is released even when the vehicle 100 is stopped, which may threaten the safety of the passenger close to the hood 101 or the trunk 102. Accordingly, opening of the hood 101 and the trunk 102 may correspond to a stop preparation condition.

Upon determining that at least one of the hood 101 and the trunk 102 of the vehicle 100 is open, the processor 670 may determine whether the brake pedal 502 has been released (S1420). Here, release of the brake pedal 502 may correspond to a stop execution condition. Since opening of at least one of the hood 101 and the trunk 102 corresponding to a stop preparation condition has been satisfied, the processor 670 may perform step S950 if release of the brake pedal 502 corresponding to a stop execution condition is met.

Figure 16:
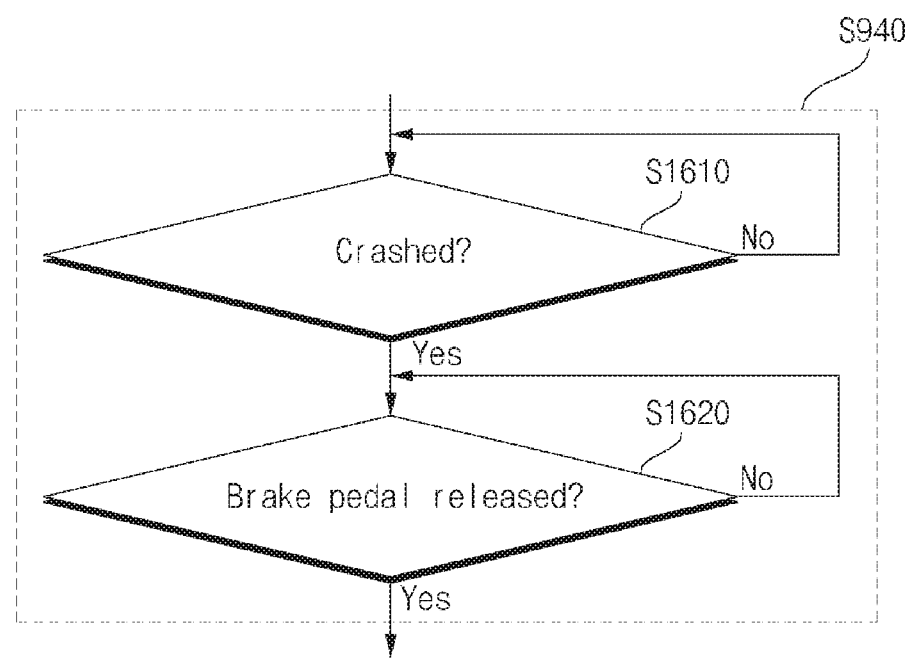
FIG. 16 is a flowchart illustrating an example of a process related to step S940 of FIG. 9.
Figure 17:
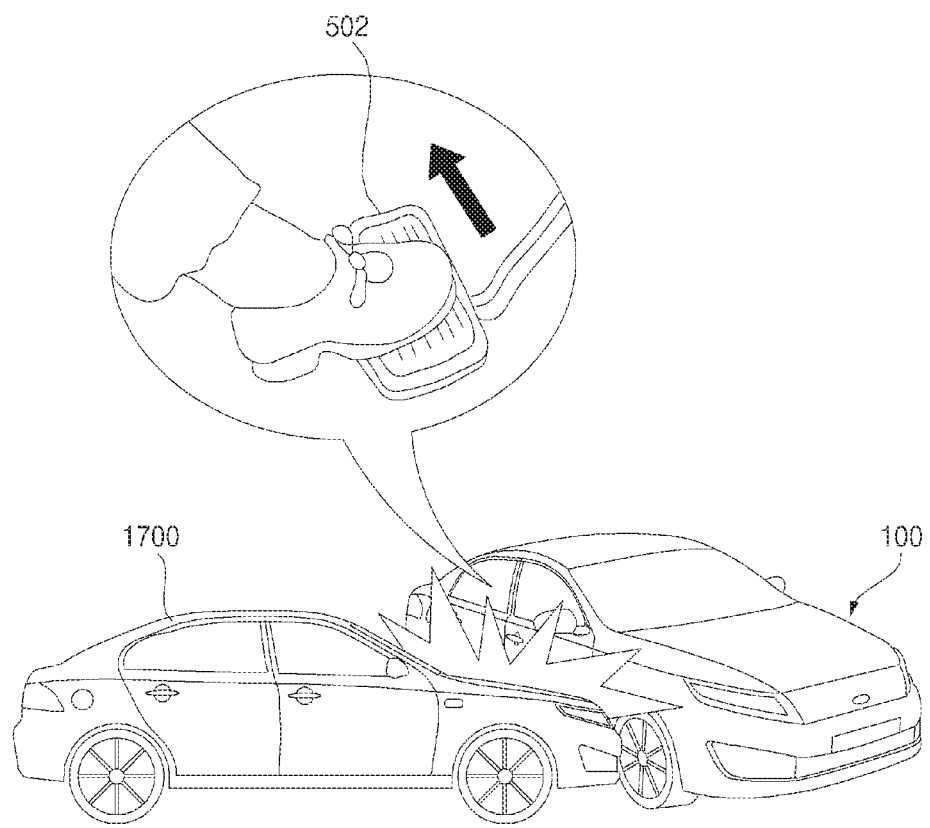
FIG. 17 is a diagram illustrating an example of an operation of the driver assistance apparatus according to the process of FIG. 16.

FIG. 16 is a flowchart of a process related to step S940 of FIG. 9 and FIG. 17 illustrates an operation of the driver assistance apparatus 600 according to the process of FIG. 16.

Referring to FIGS. 16 and 17, the processor 670 may determine whether the vehicle 100 has crashed (S1610).

Specifically, the vehicle 100 may include a plurality of impact sensors provided inside thereof. The impact sensors are disposed at predetermined positions and provide sensing signals corresponding to impulse applied thereto to the driver assistance apparatus 600. Such impact sensors may be included in the sensing unit 160 shown in FIG. 1.

FIG. 17 shows a situation in which another vehicle 1700 collides with the right side of the vehicle 100. The processor 670 may calculate a colliding portion of the body of the vehicle and impulse on the basis of sensing signals provided by the impact sensors.

When the crash accident occurs, the foot of the driver may be removed from the brake pedal 502 to release the brake pedal 502. Since the vehicle 100 may move forward or in reverse if the brake pedal 502 is released due to abrupt movement of the vehicle caused by the crash accident even when the vehicle 100 is stopped at the moment of collision, there is a high possibility of occurrence of another accident. Accordingly, occurrence of a crash accident may correspond to a stop preparation condition.

Upon determining that the vehicle 100 has crashed, the processor 670 may determine whether the brake pedal 502 has been released (S1620). Here, release of the brake pedal 502 may correspond to a stop execution condition. Since occurrence of the crash accident corresponding to a stop preparation condition has been satisfied, the processor 670 may perform step S950 if release of the brake pedal 502 corresponding to a stop execution condition is met.

The processor 670 may differentially perform stopping operations according to the magnitude of impulse caused by the crash accident. For example, when the impulse corresponds to a first level, the processor 670 performs the operation of turning off an engine of the vehicle 100. When the impulse corresponds to a second level higher than the first level, the processor 670 additionally performs the EPB activation operation.

Figure 18:
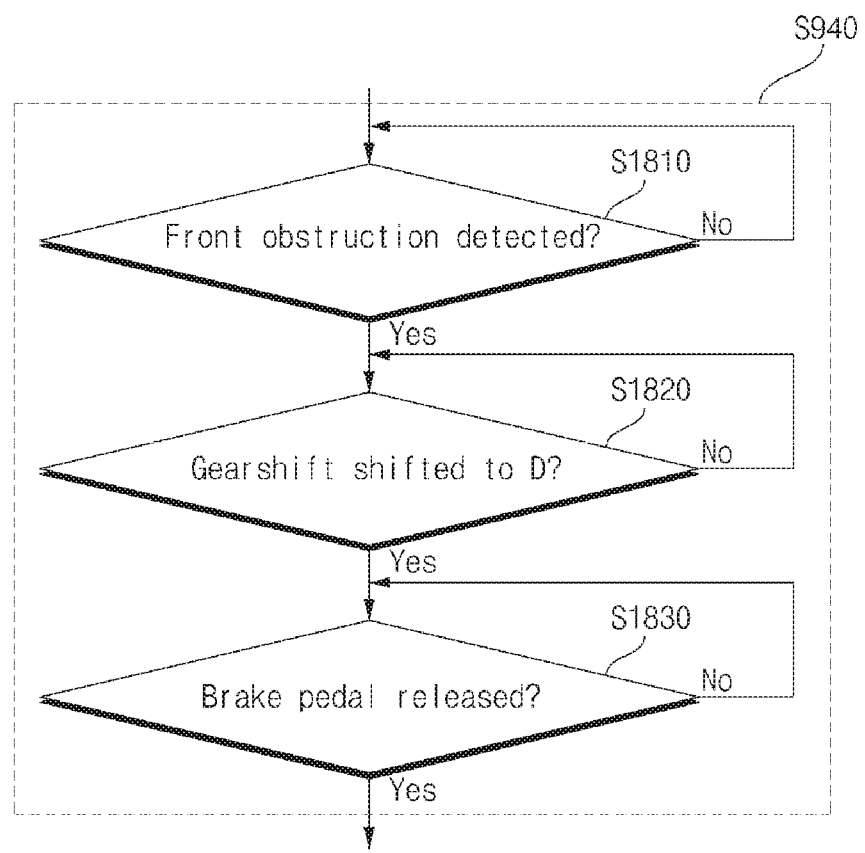
FIG. 18 is a flowchart illustrating an example of a process related to step S940 of FIG. 9.
Figure 19:
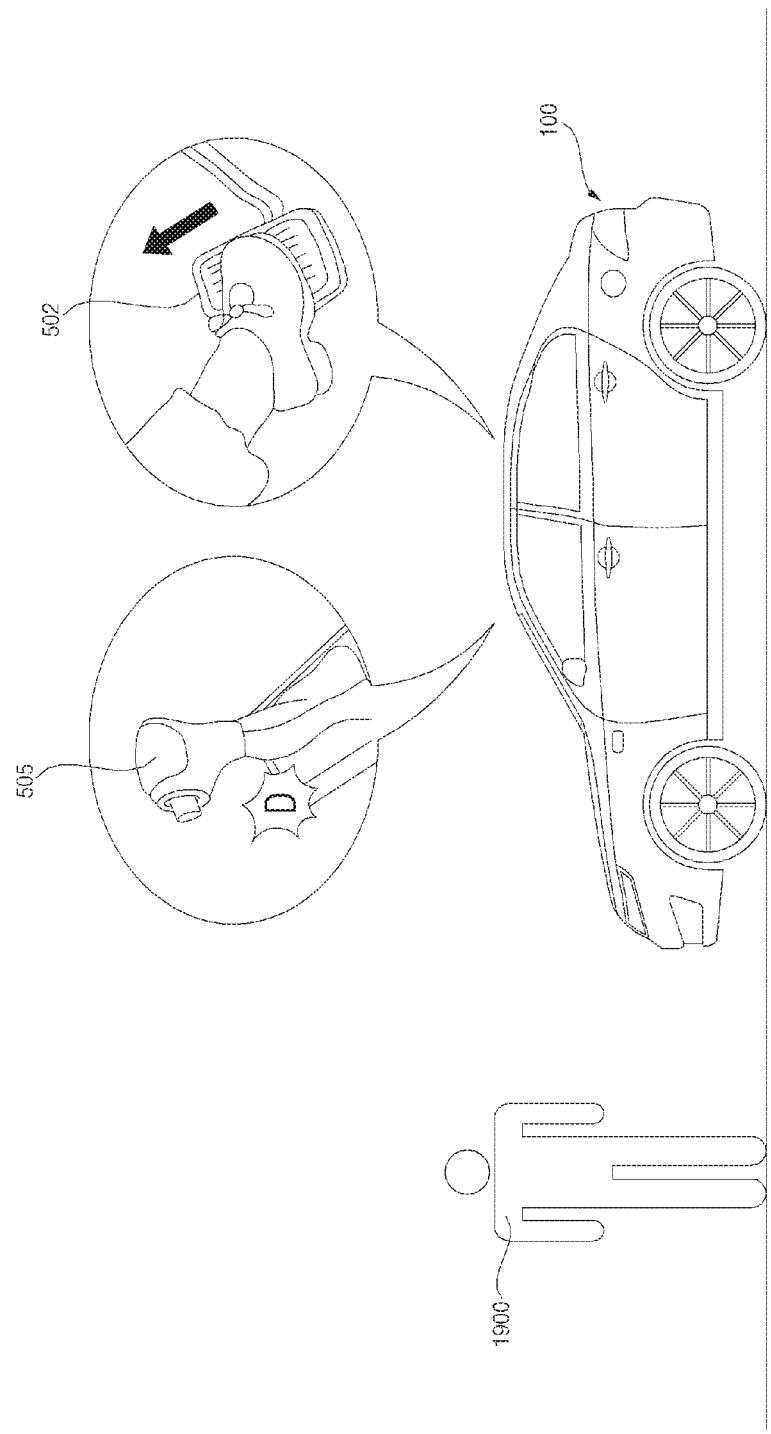
FIG. 19 is a diagram illustrating an example of an operation of the driver assistance apparatus according to the process of FIG. 18.

FIG. 18 is a flowchart of a process related to step S940 of FIG. 9 and FIG. 19 illustrates an operation of the driver assistance apparatus 600 according to the process of FIG. 18. For convenience of description, it is assumed that the vehicle 100 is located on flat land.

Referring to FIGS. 18 and 19, the processor 670 may determine whether an obstruction in front of the vehicle 100 has been detected (S1810).

Specifically, the processor 670 may receive a front view image of the vehicle 100 from the cameras 161a and 195 and detect at least one object from the received front view image. The processor 670 may classify an obstruction included in the detected object. For example, if the detected object includes a lane, a traffic sign, a pedestrian and another vehicle, the processor 670 may classify the lane and the traffic sign as non-obstructions and classify the pedestrian and the other vehicle as obstructions.

FIG. 19 shows a situation in which an obstruction 1900 is located within a predetermined distance from the front side of the vehicle 100. For example, the obstruction 1900 may be a pedestrian as shown in the figure or another vehicle, a wall or a tree.

The processor 670 may determine whether the gearshift 505 is shifted to D (S1820). Specifically, if the gearshift 505 is shifted to Park (P), Reverse (R) or Neutral (N) when the obstruction 1900 is located within a predetermined distance from the front side of the vehicle 100, the vehicle 100 does not collide with the obstruction 1900 even if the brake pedal 502 is released. However, if the gearshift 505 is shifted to Drive (D), the vehicle 100 may move forward to collide with the obstruction 1900 when the brake pedal 502 is released. Accordingly, the processor 670 checks whether the gearshift 505 is shifted to Drive (D) in step S1820 upon detection of the obstruction 1900 in step S1810.

If the brake pedal 502 is released while the vehicle 100 is stopped when the obstruction 1900 is located in front of the vehicle 100 and the gearshift 505 is shifted to D, the vehicle 100 may move forward to collide with the neighboring obstruction 1900. Accordingly, detection of the obstruction in front of the vehicle and shifting of the gearshift 505 to Drive (D) may correspond to stop preparation conditions.

When the stop preparation conditions are satisfied, the processor 670 may determine whether the brake pedal 502 has been released (S1830). Here, release of the brake pedal 502 may correspond to a stop execution condition. Since detection of the obstruction in front of the vehicle and shifting of the gearshift 505 to Drive (D) corresponding to stop preparation conditions have been satisfied, the processor 670 may perform step S950 if release of the brake pedal 502 corresponding to a stop execution condition is met.

The processor 670 may differentially perform stopping operations according to the distance between the vehicle 100 and the obstruction 1900 in front thereof. For example, when the distance between the vehicle 100 and the obstruction 1900 in front thereof corresponds to a first value, the processor 670 performs the operation of turning off the engine of the vehicle 100. When the distance between the vehicle 100 and the obstruction 1900 in front thereof corresponds to a second value less than the first value, the processor 670 additionally performs the EPB activation operation.

Figure 20:
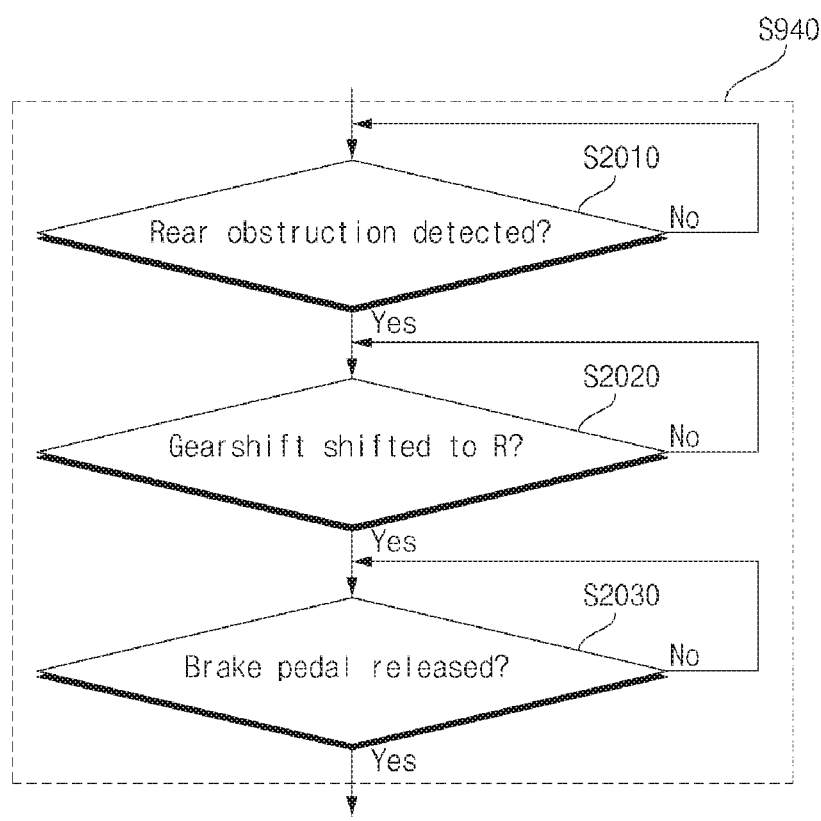
FIG. 20 is a flowchart illustrating an example of a process related to step S940 of FIG. 9.
Figure 21:
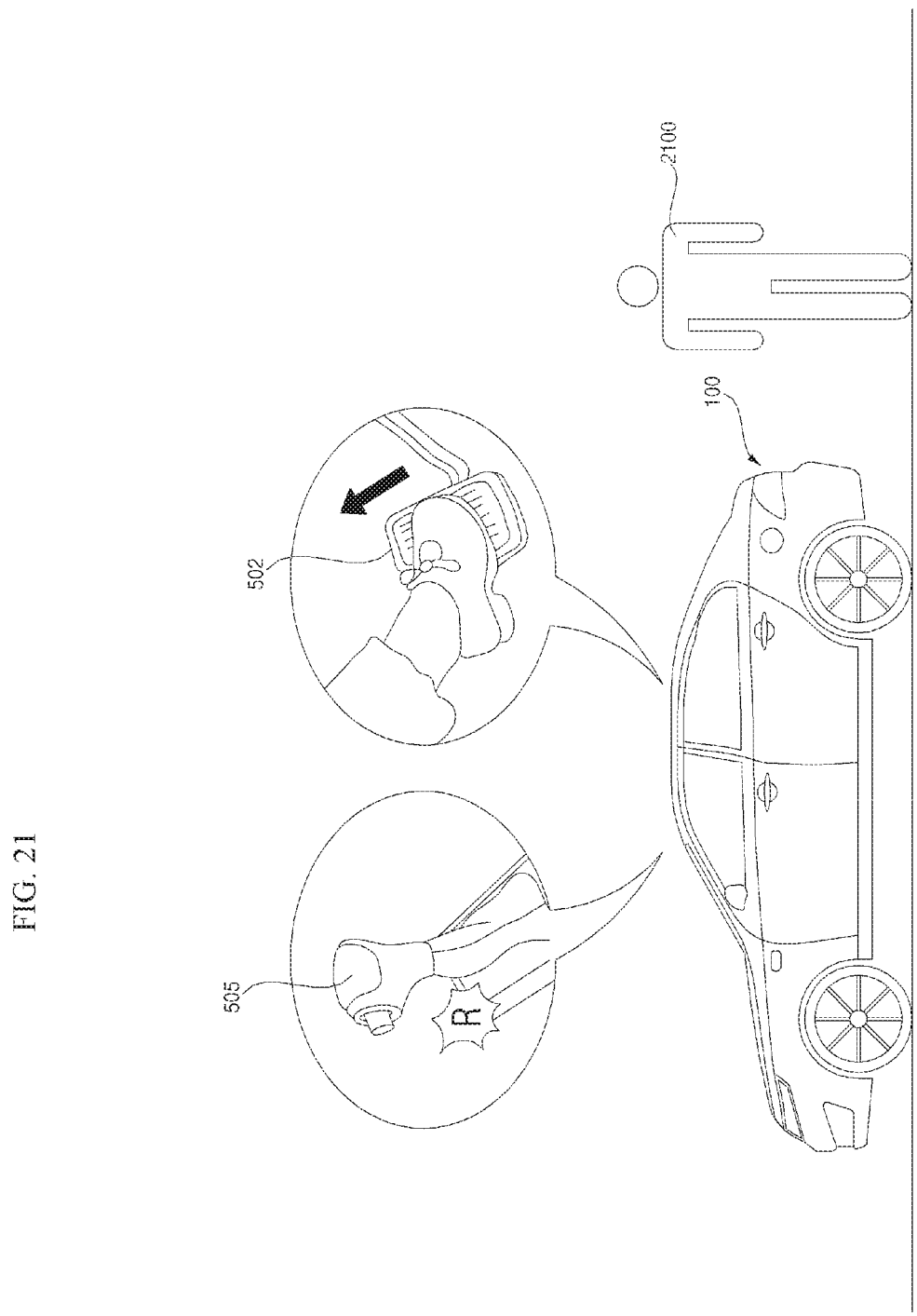
FIG. 21 is a diagram illustrating an example of an operation of the driver assistance apparatus according to the process of FIG. 20.

FIG. 20 is a flowchart of a process related to step S940 of FIG. 9 and FIG. 21 illustrates an operation of the driver assistance apparatus 600 according to the process of FIG. 18. For convenience of description, it is assumed that the vehicle 100 is located on flat land.

Referring to FIGS. 20 and 21, the processor 670 may determine whether an obstruction behind the vehicle 100 has been detected (S2010).

Specifically, the processor 670 may receive a rear view image of the vehicle 100 from the camera 161d and detect at least one object from the received rear view image. The processor 670 may classify an obstruction included in the detected object. For example, if the detected object includes a lane, a traffic sign, a pedestrian and another vehicle, the processor 670 may classify the lane and the traffic sign as non-obstructions and classify the pedestrian and the other vehicle as obstructions.

FIG. 21 shows a situation in which an obstruction 2100 is located within a predetermined distance from the rear side of the vehicle 100. For example, the obstruction 2100 may be a pedestrian, as shown in the figure, another vehicle, a wall or a tree.

The processor 670 may determine whether the gearshift 505 is shifted to Reverse (R) (S2020). Specifically, if the gearshift 505 is shifted to P, N or D when the obstruction 2100 is located within a predetermined distance from the rear side of the vehicle 100, the vehicle 100 does not collide with the obstruction 2100 even if the brake pedal 502 is released. However, if the gearshift 505 is shifted to R, the vehicle 100 may move in reverse to collide with the obstruction 2100 when the brake pedal 502 is released. Accordingly, the processor 670 checks whether the gearshift 505 is shifted to R in step S2020 upon detection of the obstruction 2100 in step S2010.

If the brake pedal 502 is released while the vehicle 100 is stopped when the obstruction 2100 is located behind the vehicle 100 and the gearshift 505 is shifted to R, the vehicle 100 may move in reverse to collide with the neighboring obstruction 2100. Accordingly, detection of the obstruction behind the vehicle and shifting of the gearshift 505 to R may correspond to stop preparation conditions.

When the stop preparation conditions are satisfied, the processor 670 may determine whether the brake pedal 502 has been released (S2030). Here, release of the brake pedal 502 may correspond to a stop execution condition. Since detection of the obstruction behind the vehicle and shifting of the gearshift 505 to R, which correspond to stop preparation conditions, have been satisfied, the processor 670 may perform step S950 if release of the brake pedal 502 corresponding to a stop execution condition is met.

The processor 670 may differentially perform stopping operations according to the distance between the vehicle 100 and the obstruction 2100 behind the vehicle. For example, when the distance between the vehicle 100 and the obstruction 2100 corresponds to a first value, the processor 670 performs the operation of turning off an engine of the vehicle 100. When the distance between the vehicle 100 and the obstruction 2100 corresponds to a second value less than the first value, the processor 670 additionally performs the EPB activation operation.

Figure 22:
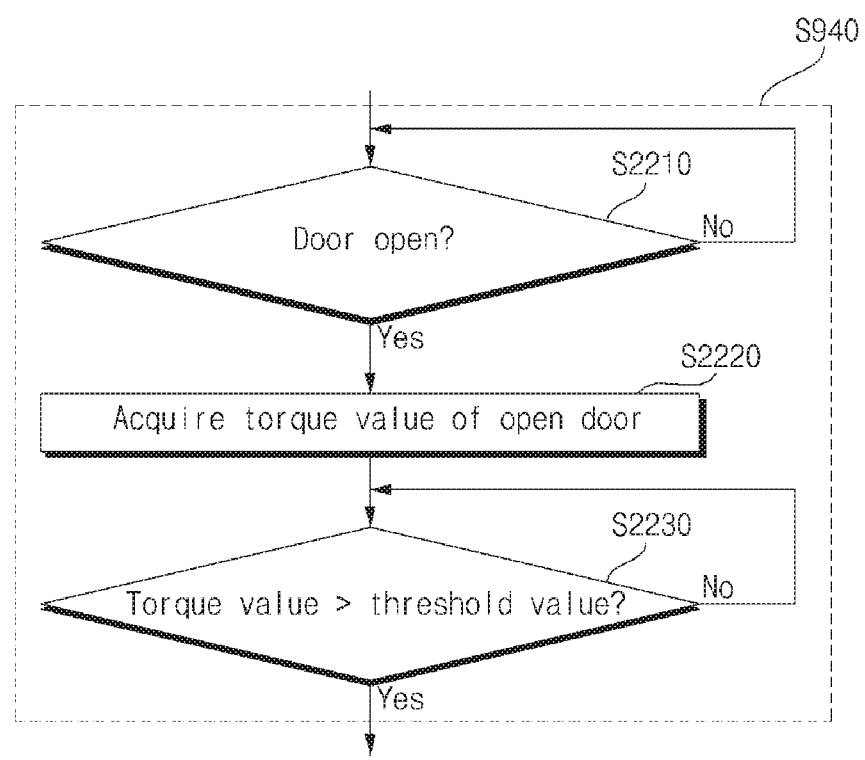
FIG. 22 is a flowchart illustrating an example of a process related to step S940 of FIG. 9.
Figure 23:
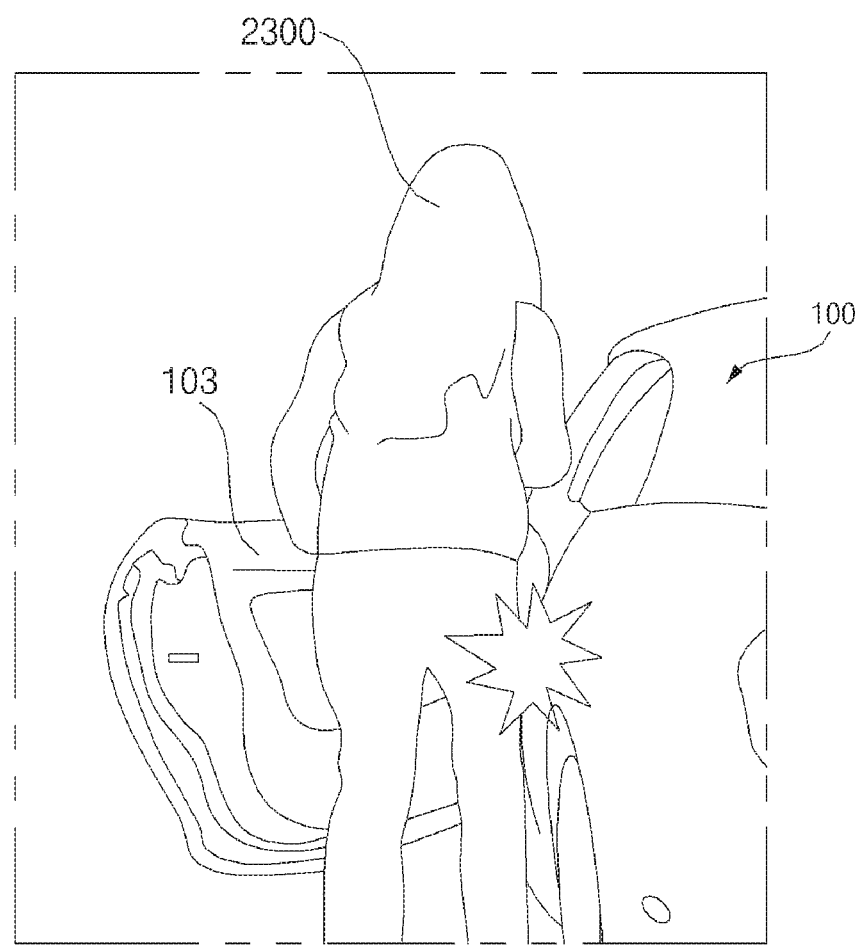
FIG. 23 is a diagram illustrating an example of an operation of the driver assistance apparatus according to the process of FIG. 22.

FIG. 22 is a flowchart of a process related to step S940 of FIG. 9 and FIG. 23 illustrates an operation of the driver assistance apparatus 600 according to the process of FIG. 22.

Referring to FIGS. 22 and 23, the processor 670 may determine whether at least one of the doors 103 of the vehicle 100 is open (S2210).

Specifically, the vehicle 100 includes at least the door 103 at the driver seat 501 and may further include additional doors 103 according to the size and use of the vehicle 100. A door opening/closing sensor may be provided per door 103. The door opening/closing sensor may be included in the sensing unit 160 shown in FIG. 1. Specifically, the door opening/closing sensor may sense whether each door 103 of the vehicle 100 is open or closed. The door opening/closing sensor may measure an opening angle of an open door. In this case, opening of a door may correspond to a stop preparation condition.

While FIG. 23 shows that driver side door 103 is open, the processor 670 may check whether a door other than the driver side door 103 is open on the basis of a sensing signal provided by the door opening/closing sensor.

When the door 103 is open, the processor 670 may acquire a torque value of the open door 103 (S2220). In this case, a torque sensor may be provided per door 103. The torque sensor may be included in the sensing unit 160 shown in FIG. 1. Specifically, the torque sensor may be provided to the shaft (e.g. hinge) of each door 103 to measure a torque value with respect to a door closing direction.

The door 103 is open when a person 2300 enters of exits the vehicle. When the vehicle 100 moves while the person 2300 does not completely ride in the vehicle through the open door, the person 2300 may be caught between the open door 103 and the body of the vehicle. If the vehicle 100 continuously moves with the person 2300 caught between the open door 103 and the body of the vehicle, not only the safety of the person 2300 is threatened but also the door 103 is damaged. Accordingly, the processor 670 may determine whether an object is caught between the open door and the body of the vehicle by acquiring a torque value from the torque sensor.

Subsequently, the processor 670 may determine whether the acquired torque value exceeds a predetermined threshold value (S2330). As such, the processor 670 may determine whether an object is caught between the open door and the body of the vehicle. Here, a torque value exceeding the threshold value may correspond to a stop execution condition. Since opening of the door 103 corresponding to a stop preparation condition has been satisfied, the processor 670 may perform step S950 if the torque value exceeding the threshold value, which corresponds to a stop execution condition, is met.

The processor 670 may differentially perform stopping operations according to the torque value. For example, when the torque value corresponds to 1.1 times the threshold value, the processor 670 performs the operation of turning off an engine of the vehicle 100. When the torque value corresponds to 1.3 times the threshold value, the processor 670 additionally performs the EPB activation operation.

Figure 24:
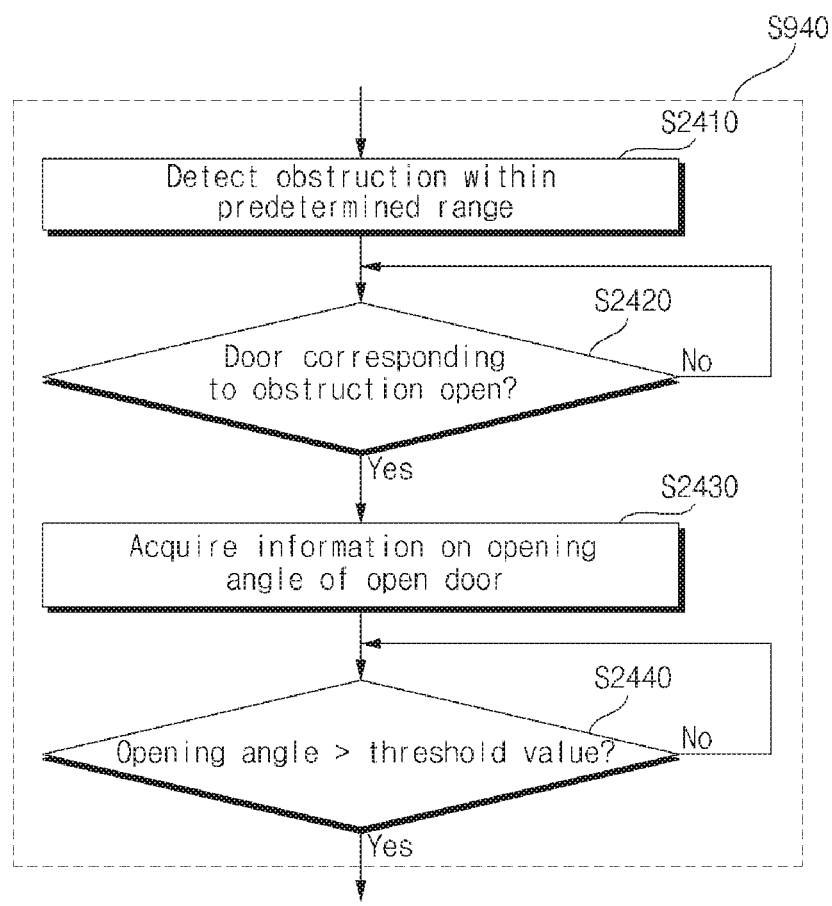
FIG. 24 is a flowchart illustrating an example of a process related to step S940 of FIG. 9.
Figure 25:
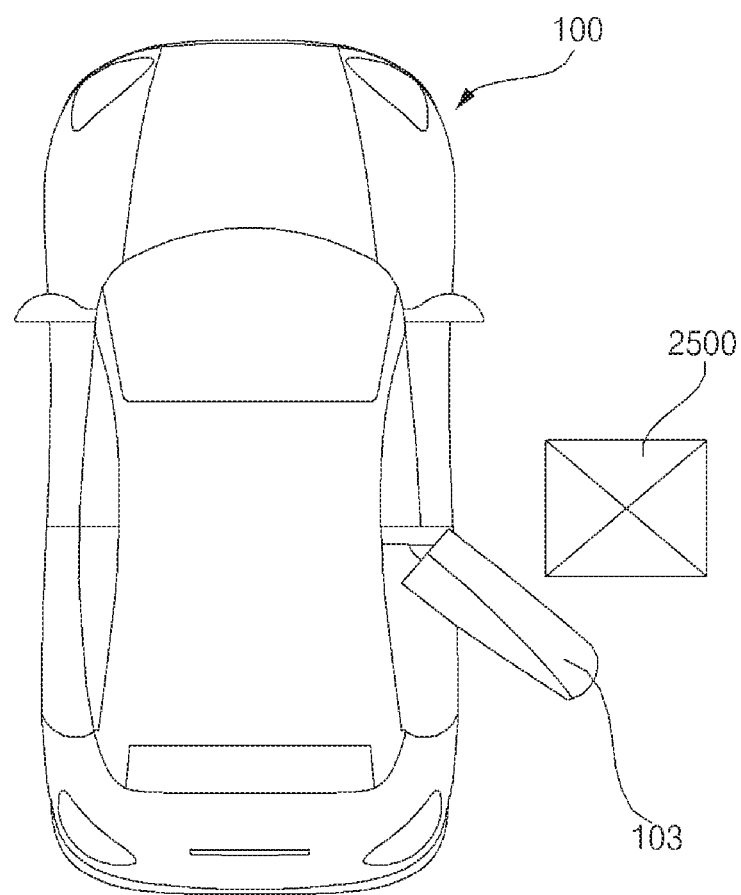
FIG. 25 is a diagram illustrating an example of an operation of the driver assistance apparatus according to the process of FIG. 24.

FIG. 24 is a flowchart of a process related to step S940 of FIG. 9 and FIG. 25 illustrates an operation of the driver assistance apparatus 600 according to the process of FIG. 24.

Referring to FIGS. 24 and 25, the processor 670 may detect an obstruction 2500 within a predetermined range from the vehicle 100 (S2410). For example, the processor 670 may detect the obstruction 2500 from an outdoor image provided by the cameras 161 and 195. Alternatively, the processor 670 may detect the obstruction 2500 on the basis of sensing signals provided by one or more sensors 162, 163 and 164 provided to the exterior of the vehicle 100, as shown in FIG. 3. In addition, the processor 670 may calculate the position of the detected obstruction 2500 on the basis of the vehicle 100.

The processor 670 may determine whether a door 103 at the side of the obstruction 2500 from among the doors 103 of the vehicle 100 is open (S2420). Specifically, the vehicle 100 includes at least the door 103 at the driver seat 501 and may further include additional doors 103 according to the size and use of the vehicle 100. Here, a door opening/closing sensor may be provided per door 103. The door opening/closing sensor may be included in the sensing unit 160 shown in FIG. 1. Specifically, the door opening/closing sensor may sense whether each door 103 of the vehicle 100 is open or closed. For example, the processor 670 may determine whether the left door is open when the obstruction 2500 is located at the left of the vehicle 100 and determine whether the right door is open when the obstruction 2500 is located at the right of the vehicle 100. In this case, opening of the door 103 at the side of the obstruction 2500 may correspond to a stop preparation condition.

While FIG. 25 shows that the right door 103 of the rear seat of the vehicle 100 is open, the processor 670 may check whether other doors are open on the basis of a sensing signal provided by the door opening/closing sensor.

Upon determining that the door 103 at the side of the obstruction 2500 is open in step S2420, the processor 670 may acquire information on the opening angle of the open door 103 (S2430). Specifically, the processor 670 may receive the information on the opening angle measured by the door opening/closing sensor provided to the open door 103.

The door 103 is open when a person enters or exits the vehicle. When the vehicle 100 moves to the obstruction 2500 with the door 103 open, the open door 103 may collide with the obstruction 2500 and be damaged. If the obstruction 2500 is a person, the person may be injured.

Subsequently, the processor 670 may determine whether the acquired opening angle exceeds a predetermined threshold value (S2440). As the opening angle increases, e.g., as the door 103 is open wider, risk of collision of the open door 103 with the obstruction 2500 increases. Here, an opening angle exceeding the threshold value may correspond to a stop execution condition. Since opening of the door 103 at the side of the obstruction 2500, which corresponds to a stop preparation condition, has been satisfied, the processor 670 may perform step S950 if the opening angle exceeding the threshold value, which corresponds to a stop execution condition, is met.

The processor 670 may differentially perform stopping operations according to the opening angle of the open door 103.

Figure 26:
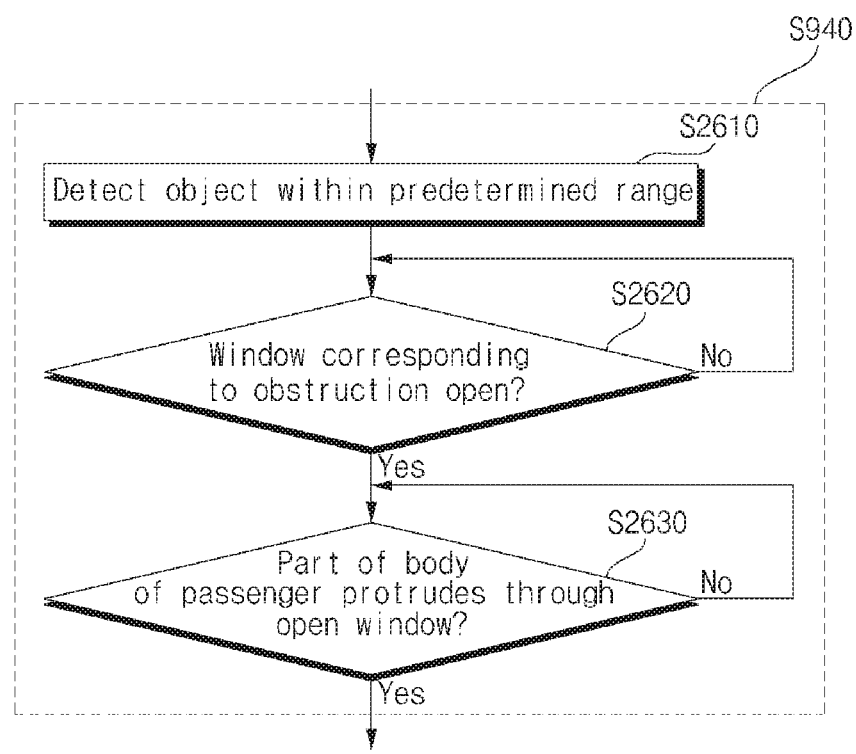
FIG. 26 is a flowchart illustrating an example of a process related to step S940 of FIG. 9.
Figure 27:
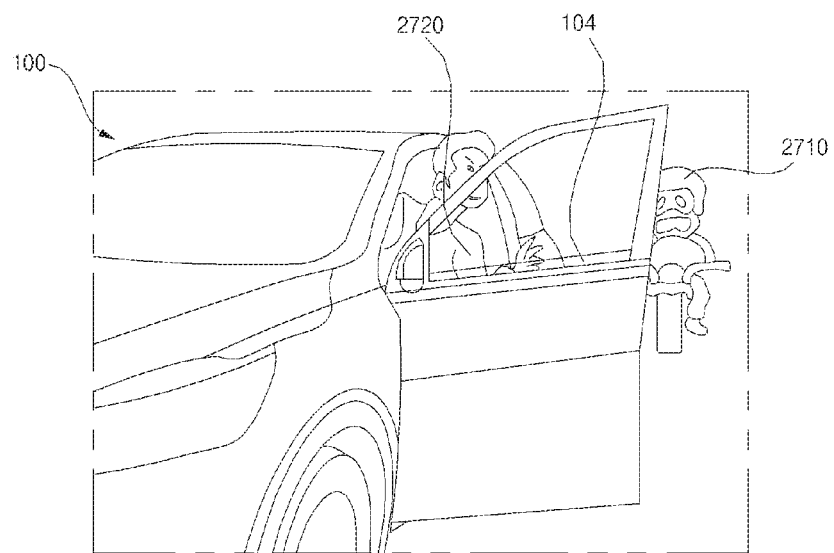
FIG. 27 is a diagram illustrating an example of an operation of the driver assistance apparatus according to the process of FIG. 26.
Figure 27:
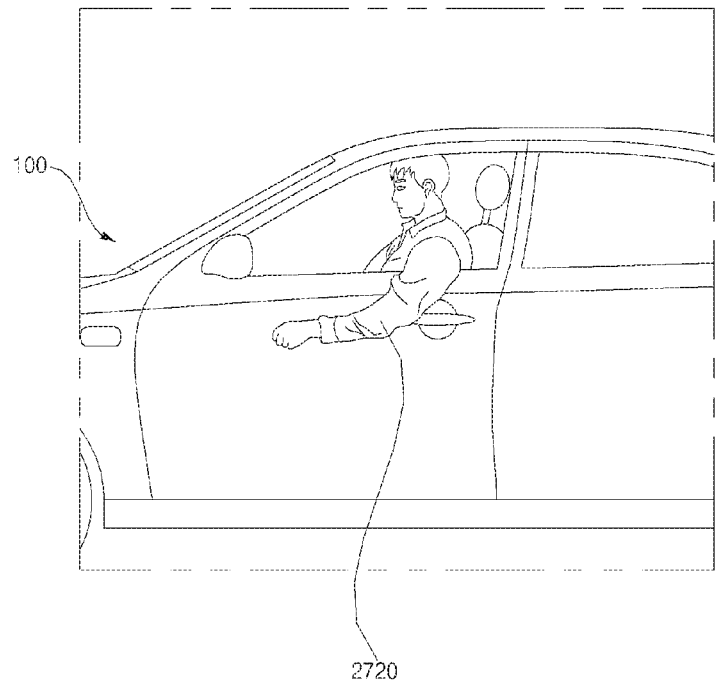

FIG. 26 is a flowchart of a process related to step S940 of FIG. 9 and FIG. 27 illustrates an operation of the driver assistance apparatus 600 according to the process of FIG. 26.

Referring to FIGS. 26 and 27, the processor 670 may detect an obstruction 2710 within a predetermined range from the vehicle 100 (S2610). For example, the processor 670 may detect the obstruction 2710 from an outdoor image provided by the cameras 161 and 195. Alternatively, the processor 670 may detect the obstruction 2710 on the basis of sensing signals provided by one or more sensors 162, 163 and 164 provided to the exterior of the vehicle 100, as shown in FIG. 3. In addition, the processor 670 may calculate the position of the detected obstruction 2710 on the basis of the vehicle 100.

The processor 670 may determine whether a window 104 at the side of the obstruction 2710 from among the windows 104 of the vehicle 100 is open (S2620). Specifically, the vehicle 100 includes at least the window 104 at the driver seat 501 and may further include additional windows 104 according to the size and use of the vehicle 100. Here, a window opening/closing sensor may be provided per window 104. The window opening/closing sensor may be included in the sensing unit 160 shown in FIG. 1. Specifically, the window opening/closing sensor may sense whether each window 104 of the vehicle 100 is open or closed. For example, the processor 670 may determine whether the left window is open when the obstruction 2710 is located at the left of the vehicle 100 and determine whether the right window is open when the obstruction 2710 is located at the right of the vehicle 100. In this case, opening of the window 104 at the side of the obstruction 2710 may correspond to a stop preparation condition.

While FIG. 27 shows that the right window 104 of the rear seat of the vehicle 100 is open, the processor 670 may check whether other windows 104 are open on the basis of a sensing signal provided by the window opening/closing sensor.

Upon determining that the window 104 at the side of the obstruction 2710 is open in step S2620, the processor 670 may determine whether part 2720 of the body of the passenger protrudes from the open window 104 (S2630). Specifically, the processor 670 may detect an object from outdoor images provided by the cameras 161*b* and 161*c* and check whether the detected object includes the part 2720 of the body of the passenger. For example, when the passenger opens the window 104 and protrudes their head or a hand, the cameras 161b and 161c may photograph the head or hand of the passenger. Accordingly, the processor 670 may analyze images captured by the cameras 161b and 161c to detect the part of the body of the passenger, such as the head or hand. Protrusion of the part 2620 of the body of the passenger from the open window 104 may correspond to a stop execution condition.

The processor 670 may automatically perform a stopping operation according to the protruding length of the part 2720 of the body of the passenger and the distance between the vehicle and the obstruction 2710.

Figure 28:
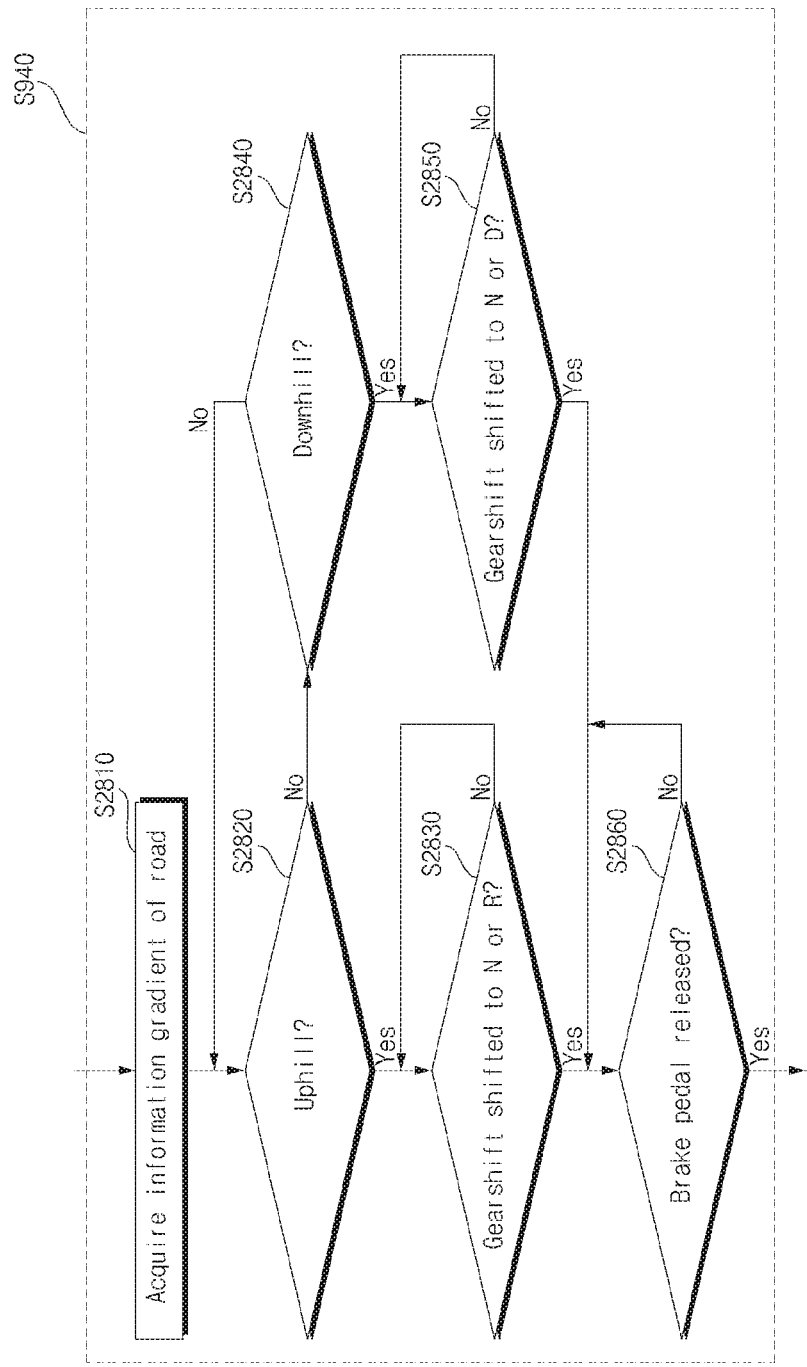
FIG. 28 is a flowchart illustrating an example of a process related to step S940 of FIG. 9.
Figure 29A:
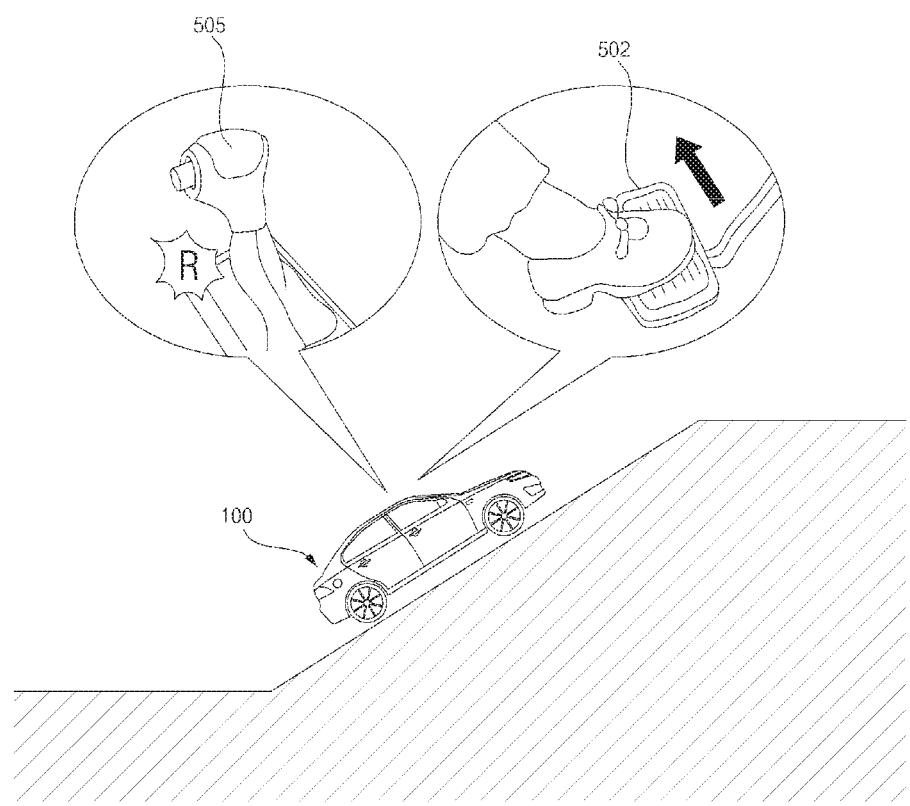
FIGS. 29A and 29B are diagrams illustrating examples of operations of the driver assistance apparatus according to the process of FIG. 28.
Figure 29B:
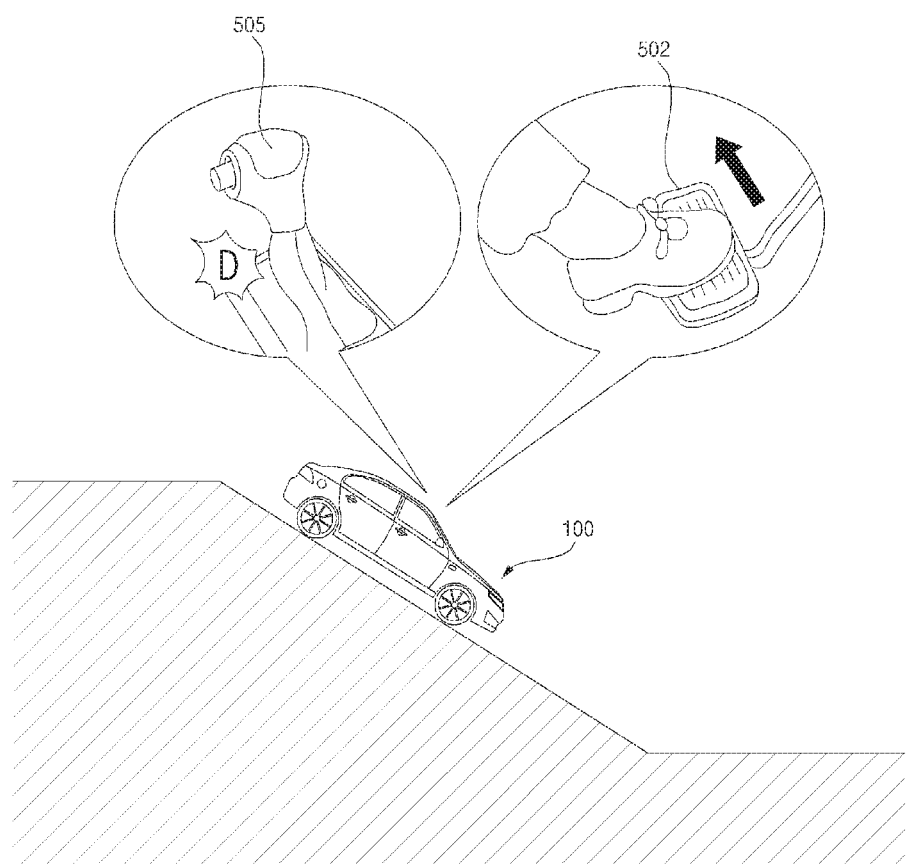

FIG. 28 is a flowchart of a process related to step S940 of FIG. 9 and FIGS. 29A and 29B illustrate operations of the driver assistance apparatus 600 according to the process of FIG. 28.

Referring to FIGS. 28, 29A, and 29B, the processor 670 may acquire information on the slope of a road on which the vehicle 100 is located (S2810). The information on the slope of the road may include a slope direction and a gradient. As such, the slope information may include information on whether the road is an uphill road or a downhill road and the gradient of the road.

The slope information may be measured by the sensing unit 160. For example, the tilt sensor may measure the slope direction and gradient of the road and provide the measured information to the driver assistance apparatus 600. The slope information may be included in navigation information. For example, the controller may acquire slope information of the road on which the vehicle 100 is currently located by matching the GPS position of the vehicle 100 with an electronic map prestored in the memory 130 and provide the acquired slope information to the driver assistance apparatus 600. Alternatively, the processor 670 may directly calculate the slope direction and gradient of the road on which the vehicle 100 is located by analyzing a front view image provided by the camera 195.

The processor 670 may determine whether the road on which the vehicle 100 is located is an uphill road on the basis of the slope information acquired in step S2810 (S2820). Upon determining that the road is an uphill road, as shown in FIG. 29A, the processor 670 may determine whether the gearshift 505 is shifted to N or R on the basis of driving information (S2830). When the gearshift 505 is shifted to P or D on an uphill road, the vehicle 100 does not move in reverse even if the brake pedal 502 is released. However, when the gearshift 505 is shifted to N or R on the uphill road, the vehicle 100 may move in reverse if the brake pedal 502 is released, causing an accident. Accordingly, location of the vehicle 100 on an uphill road and the gearshift position at N or R may correspond to stop preparation conditions.

The processor 670 may determine whether the road on which the vehicle 100 is located is a downhill road on the basis of the slope information acquired in step S2810 (S2840). Upon determining that the road is a downhill road, as shown in FIG. 29B, the processor 670 may determine whether the gearshift 505 is shifted to N or D on the basis of the driving information (S2850). When the gearshift 505 is shifted to P or R on a downhill road, the vehicle 100 does not move forward even if the brake pedal 502 is released. However, when the gearshift 505 is shifted to N or D on the downhill road, the vehicle 100 may move forward if the brake pedal 502 is released, causing an accident. Accordingly, location of the vehicle 100 on a downhill road and the gearshift position at N or D may correspond to stop preparation conditions.

When the result of one of steps S2830 and S2850 is "yes", the processor 670 may determine whether the brake pedal 502 has been released (S2860). Here, release of the brake pedal 502 may correspond to a stop execution condition. Since the stop preparation conditions according to FIG. 28 have been satisfied, the processor 670 may perform step S950 if release of the brake pedal 502 corresponding to a stop execution condition is met.

When the stopping operation performed through step S950 includes activation of the EPB or the foot brake, the processor 670 may differentially perform stopping operations according to the gradient of the road. For example, the processor 670 may increase braking power according to the EPB or the foot brake 504 as the gradient of the road increases, e.g., as the road becomes steeper. Conversely, the processor 670 may decrease braking power according to the EPB or the foot brake 504 as the gradient of the road decreases, e.g., as the road becomes less steep.

Implementations of the present disclosure may be implemented as code that may be written to a computer-readable recording medium and may thus be read by a computer. The computer-readable recording medium may be any type of recording device in which data may be stored in a computer-readable manner. Examples of the computer-readable recording medium include an HDD (Hard Disk Drive), an SSD (Solid State Disc), SDD (Silicon Disc Drive), a ROM, a RAM, a CD-ROM, a magnetic tape, a floppy disk, optical data storage, and a carrier wave, e.g., data transmission over the Internet. Although some implementations have been disclosed above for illustrative purposes, various modifications, additions and substitutions may be made without departing from the scope and spirit of the invention as disclosed in the accompanying claims.

What is claimed is:

1. A driver assistance apparatus for a vehicle provided with Idle Stop and Go (ISG), the driver assistance apparatus comprising:
    an interface configured to receive information; and
    at least one processor configured to:
        receive, through the interface, driving information of the vehicle; and
        based on a determination that the vehicle is stopped in a first state in which the ISG is enabled or that the vehicle is stopped in a second state in which a gearshift of the vehicle is engaged in other than a Park (P) mode and an engine of the vehicle is turned on, perform a stopping operation for the vehicle based on the driving information of the vehicle,
    wherein the at least one processor is further configured to:
        determine whether a passenger exits the vehicle based on a determination of whether a door of the vehicle is open; and
        in a state in which a trunk of the vehicle is open, the gearshift is engaged in a Reverse (R) mode, and the passenger exits the vehicle, perform the stopping operation for the vehicle based on a detection of an object moving behind the vehicle.

2. The driver assistance apparatus of claim 1, wherein the stopping operation for the vehicle comprises at least one of blocking a disabling operation of the ISG, turning off the engine of the vehicle, or activation of a parking brake of the vehicle.

3. The driver assistance apparatus of claim 2, wherein the at least one processor is further configured to:
    determine whether a first stopping condition and a second stopping condition for the vehicle are satisfied based on data included in the driving information of the vehicle; and perform the stopping operation for the vehicle based on a determination that the first stopping condition and the second stopping condition are sequentially satisfied.

4. The driver assistance apparatus of claim 3, wherein: the first stopping condition comprises at least one of an opening of a door of a driver seat of the vehicle, a release of a safety belt of the driver seat, an opening of a trunk of the vehicle, an opening of a hood of the vehicle, detection of an obstruction around the vehicle, or occurrence of an accident involving the vehicle, and the second stopping condition comprises a release of a brake pedal of the vehicle.

5. The driver assistance apparatus of claim 3, wherein: the first stopping condition comprises a shifting of the gearshift of the vehicle to a Neutral (N) mode or a Reverse (R) mode while the vehicle is on an uphill road, or a shifting of the gearshift to the Neutral (N) mode or a Drive (D) mode while the vehicle is on a downhill road, and the second stopping condition comprises a release of a brake pedal of the vehicle.

6. The driver assistance apparatus of claim 5, wherein the stopping operation for the vehicle comprises the activation of the parking brake of the vehicle comprising at least one of an activation of an electronic parking brake (EPB) of the vehicle or an activation of a foot parking brake of the vehicle, and
the at least one processor is further configured to control a braking power of the vehicle according to the EPB or the foot parking brake based on a gradient of the uphill road or a gradient of the downhill road.

7. The driver assistance apparatus of claim 3, wherein: the first stopping condition comprises continuous application of a brake pedal of the vehicle since a most recent time the vehicle was stopped, and
the second stopping condition comprises the vehicle moving at a speed greater than or equal to a threshold speed for a distance greater than or equal to a threshold distance.

8. The driver assistance apparatus of claim 1, wherein the at least one processor is further configured to perform the stopping operation for the vehicle based on a detection that an object is caught in an open door of the vehicle.

9. The driver assistance apparatus of claim 8, wherein: the driving information comprises a torque value measured by a torque sensor associated with the open door, and
the at least one processor is configured to detect that the object is caught in the open door based on the torque value associated with the open door.

10. The driver assistance apparatus of claim 1, wherein the at least one processor is further configured to:
in a state in which the trunk of the vehicle is open on an uphill road, the gearshift is engaged in a Neutral (N) mode, and the passenger exits the vehicle, perform the stopping operation based on a determination of a brake pedal of the vehicle being released and based on the detection of the object moving behind the vehicle.

11. The driver assistance apparatus of claim 1, wherein: the interface is configured to receive sensing information from at least one sensor provided at a rear portion of the vehicle, and
the at least one processor is configured to detect the object moving behind the vehicle based on the sensing information received from the at least one sensor provided at the rear portion of the vehicle.

12. The driver assistance apparatus of claim 1, wherein: the interface is configured to receive an image of an outside of the vehicle provided by a camera included in the vehicle, and
the at least one processor is further configured to:
detect at least one object from the image of the outside of the vehicle; and
perform the stopping operation for the vehicle based on object information regarding the at least one object detected from the image of the outside of the vehicle,
wherein the object information comprises at least one of a type, a position, a speed, a shape, or a size of the at least one object.

13. The driver assistance apparatus of claim 12, wherein the at least one processor is further configured to:
based on a determination that the at least one object detected from the image of the outside of the vehicle comprises an obstruction, perform the stopping operation for the vehicle based on a relative position of the obstruction with respect to the vehicle,
wherein the obstruction corresponds to at least one of another vehicle, a pedestrian, a tree, a fallen object, or a structure.

14. The driver assistance apparatus of claim 13, wherein the at least one processor is configured to perform the stopping operation for the vehicle based on a determination that the obstruction is located within a threshold distance from a front side of the vehicle and that the gearshift of the vehicle is engaged in a Drive (D) mode.

15. The driver assistance apparatus of claim 13, wherein the at least one processor is further configured to perform the stopping operation for the vehicle based on a determination that the obstruction is located within a threshold distance from a rear side of the vehicle and that the gearshift of the vehicle is engaged in a Reverse (R) mode.

16. The driver assistance apparatus of claim 13, wherein the driving information comprises information regarding an open state of at least one door of the vehicle and an information regarding an opening angle of an open door of the vehicle, and
the at least one processor is further configured to, based on a determination that a door of the vehicle is open and that the obstruction is located at a side of the door that is open, perform the stopping operation for the vehicle based on an opening angle of the door that is open.

17. The driver assistance apparatus of claim 13, wherein the driving information comprises information regarding whether at least one window of the vehicle is open, and
the at least one processor is further configured to, based on a determination that a window of the vehicle is open, that the obstruction is located at a side of the window that is open, and that the detected object comprises a part of a body of a passenger protruding from the window that is open, perform the stopping operation for the vehicle based on a protruding length of the part of the body of the passenger.

18. The driver assistance apparatus of claim 17, wherein the at least one processor is further configured to stop execution of the stopping operation for the vehicle based on a determination that the part of the body of the passenger protruding from the window that is open has moved inside the window that is open.

19. The driver assistance apparatus of claim 1, wherein the at least one processor is further configured to output, through an output device included in the vehicle and based on performing the stopping operation of the vehicle, a message regarding the stopping operation.

* * * * *